(12) United States Patent
Topp

(10) Patent No.: US 10,596,691 B2
(45) Date of Patent: Mar. 24, 2020

(54) DEVICES AND METHODS OF USING THEM TO ASSEMBLE TWO OR MORE WORKPIECES TO EACH OTHER

(71) Applicant: Stuart Topp, Randolph, VA (US)

(72) Inventor: Stuart Topp, Randolph, VA (US)

( * ) Notice: Subject to any disclaimer, the term of this patent is extended or adjusted under 35 U.S.C. 154(b) by 298 days.

(21) Appl. No.: 15/687,751

(22) Filed: Aug. 28, 2017

(65) Prior Publication Data

US 2018/0215026 A1    Aug. 2, 2018

Related U.S. Application Data

(60) Provisional application No. 62/452,249, filed on Jan. 30, 2017.

(51) Int. Cl.

| B25C 7/00 | (2006.01) |
|---|---|
| B25B 5/06 | (2006.01) |
| B25C 1/04 | (2006.01) |
| B25B 5/00 | (2006.01) |
| B25F 5/02 | (2006.01) |
| B25B 21/00 | (2006.01) |
| B25C 5/13 | (2006.01) |

(Continued)

(52) U.S. Cl.
CPC ............... B25C 7/00 (2013.01); B25B 5/003 (2013.01); B25B 5/061 (2013.01); B25B 21/00 (2013.01); B25C 1/04 (2013.01); B25C 1/042 (2013.01); B25C 1/047 (2013.01); B25C 1/048 (2013.01); B25C 5/13 (2013.01); B25F 5/02 (2013.01); F16B 12/04 (2013.01); F16B 12/12 (2013.01)

(58) Field of Classification Search
CPC .. F16K 35/14; B25C 7/00; B25C 1/04; B25C 5/13; B25C 1/048; B25C 1/047; B25C 1/042; B25F 5/02; B25B 5/003; B25B 5/061; B25B 21/00; F16B 12/12; F16B 12/04
USPC ............... 144/253.4, 253.8; 227/30; 251/149
See application file for complete search history.

(56) References Cited

U.S. PATENT DOCUMENTS

| 2,423,482 A | * | 7/1947 | Chochol | ............ F16P 3/22 |
|---|---|---|---|---|
| | | | | 192/131 R |
| 3,112,105 A | * | 11/1963 | Keller | ............ B25B 5/142 |
| | | | | 269/236 |

(Continued)

FOREIGN PATENT DOCUMENTS

CA        982526 A1 * 1/1976

OTHER PUBLICATIONS

ISR/WO for PCT/US18/015660 dated Apr. 20, 2018.

*Primary Examiner* — Robert F Long
(74) *Attorney, Agent, or Firm* — Rhodes IP PLC; Christopher R. Rhodes

(57) ABSTRACT

Certain embodiments described herein are directed to devices which can be used to safely secure two or more workpieces to each other, e.g., to secure a cabinet face frame to a cabinet frame. In some examples, the device comprises a base configured to engage a first surface of the first workpiece and to receive an attachment device. The base can also be configured to engage a first surface of a second workpiece. The device may also comprise piston means configured to engage the second workpiece at a second surface. The device may comprise one or more plungers that can be used to actuate the attachment device to permit fastening of the workpieces once properly arranged. Methods of using the device are also described.

19 Claims, 16 Drawing Sheets

(51) Int. Cl.
*F16B 12/04* (2006.01)
*F16B 12/12* (2006.01)

(56) References Cited

U.S. PATENT DOCUMENTS

| | | | | |
|---|---|---|---|---|
| 3,147,484 | A | 9/1964 | Nelson | |
| 3,488,828 | A * | 1/1970 | Gallagher | E04F 21/0038 29/451 |
| 3,734,381 | A * | 5/1973 | Blevio | B27F 7/025 227/148 |
| 4,126,259 | A | 11/1978 | Glaser | |
| 4,258,873 | A * | 3/1981 | Vela | B27M 3/0073 227/100 |
| 4,447,172 | A * | 5/1984 | Galbreath | E01D 19/06 404/65 |
| 4,574,452 | A | 3/1986 | Kennedy | |
| 4,885,836 | A * | 12/1989 | Bonomi | B21J 15/10 29/524.1 |
| 5,033,555 | A * | 7/1991 | Carter | B23K 9/287 173/50 |
| 5,051,044 | A * | 9/1991 | Allen | B25H 1/0064 33/371 |
| 5,134,812 | A * | 8/1992 | Hoffman | F16B 1/0014 403/305 |
| 5,150,598 | A * | 9/1992 | Uchida | B21D 31/06 100/259 |
| 5,246,217 | A * | 9/1993 | Brot | B23Q 3/103 269/25 |
| 5,325,581 | A * | 7/1994 | Sun | B23Q 39/042 269/266 |
| 5,360,305 | A * | 11/1994 | Kerrigan | B25C 5/0257 29/505 |
| 5,365,713 | A * | 11/1994 | Nicholas | E04B 1/681 52/396.03 |
| 5,502,930 | A * | 4/1996 | Burkette | E04B 2/7429 16/225 |
| 5,667,126 | A * | 9/1997 | Boucek | B21J 15/14 227/109 |
| 6,014,802 | A * | 1/2000 | Guerin | B21J 15/10 29/407.01 |
| 6,089,434 | A * | 7/2000 | Gleason | B27F 7/02 227/110 |
| 6,098,972 | A * | 8/2000 | Klimach | B25B 5/145 269/139 |
| 6,128,812 | A * | 10/2000 | Link | B23B 29/242 29/27 C |
| 6,269,527 | B1 * | 8/2001 | Nelson | B23P 19/04 29/33 R |
| 6,311,591 | B1 * | 11/2001 | Grossmann | B23Q 1/5406 29/27 C |
| 6,994,354 | B2 * | 2/2006 | Sakata | F16J 15/024 123/195 C |
| 7,090,226 | B1 * | 8/2006 | Trainor | E06B 3/6202 277/630 |
| 7,226,253 | B2 | 6/2007 | Otten | |
| 7,641,424 | B1 | 1/2010 | Sommerfield | |
| 7,682,112 | B2 * | 3/2010 | Panczuk | B64F 5/10 409/132 |
| 8,113,735 | B2 * | 2/2012 | Tominaga | B29C 65/08 403/274 |
| 8,186,692 | B2 * | 5/2012 | Durocher | F16J 15/0887 277/631 |
| 8,196,269 | B2 * | 6/2012 | Dais | B65D 33/2541 24/399 |
| 8,241,080 | B2 * | 8/2012 | Ichikawa | B63H 20/32 440/52 |
| 8,807,549 | B2 | 8/2014 | Henze | |
| 8,875,604 | B2 * | 11/2014 | Tsuyusaki | B23B 3/30 82/121 |
| 8,887,360 | B2 * | 11/2014 | Fukuoka | B23B 3/162 29/27 C |
| 2001/0006719 | A1 * | 7/2001 | Krimm | F16H 59/10 428/194 |
| 2003/0019544 | A1 | 1/2003 | Durney | |
| 2003/0068207 | A1 * | 4/2003 | Sarh | B23B 47/28 408/1 R |
| 2003/0135965 | A1 * | 7/2003 | Wales | A44B 99/00 24/559 |
| 2003/0143041 | A1 * | 7/2003 | Soderman | B25H 1/0064 408/111 |
| 2004/0040809 | A1 * | 3/2004 | Gustavsson | F16F 1/3713 188/379 |
| 2004/0075206 | A1 * | 4/2004 | Starr | B21J 15/42 269/25 |
| 2006/0065699 | A1 * | 3/2006 | Lang | B21D 39/031 228/136 |
| 2006/0265859 | A1 * | 11/2006 | Lanni | B21J 15/025 29/559 |
| 2007/0107547 | A1 * | 5/2007 | Oiwa | B23B 5/02 74/815 |
| 2009/0044773 | A1 * | 2/2009 | Hu | F02F 7/006 123/90.38 |
| 2009/0121405 | A1 | 5/2009 | Brown | |
| 2009/0308214 | A1 * | 12/2009 | Watanabe | B23B 3/165 29/27 R |
| 2010/0006554 | A1 * | 1/2010 | Inoue | F21S 41/147 219/202 |
| 2010/0193210 | A1 * | 8/2010 | Krauter | B25F 5/006 173/171 |
| 2012/0024930 | A1 * | 2/2012 | Myburgh | B25C 5/0292 227/19 |
| 2012/0107064 | A1 * | 5/2012 | Chen | B23Q 39/023 409/203 |
| 2013/0168118 | A1 * | 7/2013 | Yamane | B23Q 5/04 173/29 |
| 2015/0128530 | A1 * | 5/2015 | Brunson | B65B 9/135 53/441 |

* cited by examiner

SECTION A-A

SECTION A-A

DEVICES AND METHODS OF USING THEM TO ASSEMBLE TWO OR MORE WORKPIECES TO EACH OTHER

PRIORITY APPLICATION

This application is related to, and claims priority to and the benefit of, U.S. Provisional Application No. 62/452,249 filed on Jan. 30, 2017, the entire disclosure of which is hereby incorporated herein by reference for all purposes.

TECHNOLOGICAL FIELD

This application is related to devices that can be used to attach two or more workpieces to each other. More particularly, this application is related to devices which can be used to position and attach a cabinet face to a cabinet frame structure.

BACKGROUND

Cabinet assembly often involves tedious processes to attach a cabinet face to a cabinet frame. For example, biscuit joinery or pocket screws are often used. Preparation of the cabinet components using these and other methods is time consuming and costly.

SUMMARY

Certain features, aspects and embodiments described herein are directed to devices, systems and methods that are designed to position two or more workpieces and attach the workpieces to each other. The device may comprise suitable fluid circuits to permit fluid to flow and control various actuation devices such as a staple gun, nail gun, screw gun, etc.

In one aspect, a device configured to attach two workpieces to each other comprises a base, a first handle, a second handle and a pneumatic cylinder. In some configurations, the base comprises a planar member configured to engage a planar surface of a first workpiece, the base further comprising an angled member coupled to the planar member, the angled member configured to engage a first planar surface of a second workpiece positioned adjacent to the first workpiece, the angled member further configured to receive an attachment device. In some instances the first handle is coupled to the base, in which the first handle comprises a first internal valve configured to fluidically couple to an external pressure source, in which the first handle further comprises a first plunger configured to actuate the first internal valve to an open position after movement of the first plunger from a first position to a second position and to close the first internal valve after release of the first plunger to the first position. In other examples, the second handle is coupled to the base, in which the second handle comprises a second internal valve configured to fluidically couple to the first internal valve of the first handle upon movement of the first plunger of the first handle to the second position of the first internal valve, in which the second handle further comprises a second plunger configured to actuate the second internal valve to an open position after movement of the second plunger from a first position to a second position and to close the second internal valve after release of the second plunger to the first position, wherein the second internal valve is configured to fluidically couple to the attachment device when the second plunger is moved to the second position to actuate the attachment device and insert a fastener into the first and second workpieces to hold them together. In certain embodiments, the pneumatic cylinder is coupled to the planar member of the base and fluidically coupled to the first internal valve of the first handle upon movement of the first plunger of the first handle from the first position to the second position, the pneumatic cylinder configured to engage a second planar surface of the second workpiece when the first plunger is moved from the first position to the second position. These various components can be packaged together in a kit, or the base can be present in the device and an end-user may add the first handle, the second handle and the pneumatic cylinder to the base prior to use.

In certain examples, the device further comprises an attachment device removably coupled to the angled member of the base. In other examples, the attachment device is configured as a pneumatic stapler, a pneumatic nail gun, a pneumatic brad gun or a pneumatic screw gun. In some examples, the first handle further comprises a first plunger block configured to prevent movement of the first plunger from the first position to the second position in a first state of the first plunger block and to permit movement of the first plunger from the first position to the second position in a second state of the first plunger block. In other examples, the second handle further comprises a second plunger block configured to prevent movement of the second plunger from the first position to the second position in a first state of the second plunger block and to permit movement of the second plunger from the first position to the second position in a second state of the second plunger block. In certain instances, the pneumatic cylinder comprises a piston shaft and a head, wherein the piston shaft is configured to move from a first position to a second position upon fluidic coupling of the first handle to the pneumatic cylinder, and wherein in the second position of the piston shaft the head of the pneumatic cylinder engages the second planar surface of the second workpiece. In other instances, the head comprises a non-marring material. In some examples, the first plunger of the first handle is configured as a button plunger shaft assembly. In some configurations, the second plunger of the second handle is configured as a button plunger shaft assembly. In some embodiments, the first handle further comprises a 3-way valve configured to fluidically couple the pneumatic cylinder to the first handle when the first plunger is moved from the first position to the second position and to fluidically couple the second handle to the first handle when the first plunger is moved from the first position to the second position. In other embodiments, the second plunger of the second handle is configured as a button plunger shaft assembly. In certain configurations, the second handle further comprises a valve, e.g., a 2-way valve or a 3-way valve, configured to fluidically couple the attachment device to the second handle when the second plunger is moved from the first position to the second position. In some examples, the pneumatic cylinder is coupled to the base through an adjustable mount. In other examples, the pneumatic cylinder is coupled to the base through a fixed mount. In some instances, each of the first handle and the second handle comprises a cylindrical handle core configured to receive a button plunger shaft assembly and a valve. In certain instances, the device comprises a first fluid line that provides fluidic coupling between the first internal valve of the first handle and the pneumatic cylinder when the first plunger of the first handle is moved from the first position to the second position In other instances, the device comprises a second fluid line that provides fluidic coupling between the first internal valve of the first handle and the second handle when the first plunger of the first handle is moved from the first position to the second position. In some configurations, the device comprises a third fluid line that provides fluidic coupling between the second internal valve of the second handle and the attachment device when the second plunger of the second handle is moved from the first position to the second position. In some embodiments, the device is configured such that movement of the first plunger to the second position of the first plunger and movement of the second plunger to the second position of the second plunger is configured to dispense a single fastener from the attachment device. In some examples, the second plunger is configured to be released to permit movement of the second plunger to the first position after dispensing of the single fastener before another fastener can be dispensed from the attachment device.

In another aspect, a device configured to attach a first workpiece to a second workpiece, the device comprises a base comprising a planar member configured to engage a planar surface of a first workpiece, the base further comprising an angled member coupled to the planar member, the angled member configured to engage a first planar surface of a second workpiece positioned adjacent to the first workpiece, the angled member further configured to receive an attachment means. The device may also comprise first actuation means coupled to the base, in which the first actuation means comprises a first internal valve configured to fluidically couple to an external pressure source, in which the first actuation means further comprises a first plunger configured to actuate the first internal valve to an open position after movement of the first plunger from a first position to a second position and to close the first internal valve after release of the first plunger to the first position. The device may also comprise second actuation means coupled to the base, in which the second actuation means comprises a second internal valve configured to fluidically couple to the first internal valve of the first actuation means upon movement of the first plunger of the first actuation means to the second position of the first internal valve, in which the second actuation means further comprises a second plunger configured to actuate the second internal valve to an open position after movement of the second plunger from a first position to a second position and to close the second internal valve after release of the second plunger to the first position, wherein the second internal valve is configured to fluidically couple to the attachment means when the second plunger is moved to the second position to actuate the attachment means and insert a fastener into the first and second workpieces to hold them together. The device may also comprise piston means coupled to the planar member of the base and fluidically coupled to the first internal valve of the first actuation means upon movement of the first plunger of the first actuation means from the first position to the second position, the piston means configured to engage a second planar surface of the second workpiece when the first plunger is moved from the first position to the second position.

In certain embodiments, the device comprises the attachment means reversibly coupled to the base. In other embodiments, the attachment means is configured to dispense at least one of a staple, a brad, a nail or a screw. In some examples, the first actuation means and the second actuation means each comprise a cylindrical handle core. In certain embodiments, the first internal valve of the first actuation means is configured as a 2-way valve or a 3-way valve. In other examples, the second internal valve of the second actuation means is configured as a 2-way valve or a 3-way valve. In some examples, the piston means comprises a piston shaft coupled to a head. In certain instances, the second actuation means is configured to reset and permit dispensing of another fastener from the attachment means only after release of the second plunger to the first position. In some examples, the device comprises a plunger block coupled to the first actuation means. In other examples, the device comprises a plunger block coupled to the second actuation means.

In an additional aspect, a method of coupling two workpieces to each other comprises positioning one or more of the devices described herein with a first workpiece and a second workpiece, and coupling the workpieces together by actuating an attachment device coupled to the angled member of the base to insert a fastener into both of the first workpiece and the second workpiece.

In some instances, the method comprises selecting the first workpiece to be a cabinet frame and selecting the second workpiece to be a cabinet face. In certain examples, the method comprises configuring the attachment device to dispense a single fastener into the first workpiece and the second workpiece upon movement of the second plunger to the second position. In other examples, the method comprises configuring the base to be offset from a center of the base when the angled member contacts the workpiece. In certain instances, the method comprises providing the attachment device. In some embodiments, the method comprises providing instructions for using the attachment device and the devices described herein to couple a cabinet face to a cabinet frame. In other examples, the method comprises providing an adhesive to couple the first workpiece to the second workpiece.

In another aspect, a method of coupling two workpieces to each other comprises positioning one or more of the device described herein with a first workpiece and a second workpiece, and coupling the workpieces together by actuating the attachment means coupled to the angled member of the base to insert a fastener into both of the first workpiece and the second workpiece. In some configurations, the method comprises selecting the first workpiece to be a cabinet frame and selecting the second workpiece to be a cabinet face. In other configurations, the method comprises configuring the attachment means to dispense a single fastener into the first workpiece and the second workpiece upon movement of the second plunger to the second position.

In an additional aspect, a kit comprises one or more of the devices described herein and instructions for using the device to attach a cabinet face to a cabinet frame. In some examples, the kit also comprises an attachment device configured to couple to the angled member. In other examples, the kit also comprises a fastener configured to be dispensed from the attachment device. In some embodiments, the kit comprises a second attachment device different from the attachment device. In other examples, the kit comprises a second pneumatic cylinder different from the pneumatic cylinder.

In another aspect, a kit comprises an attachment means configured to couple to the angled member of the base. In some examples, the kit may comprise a fastener configured to be dispensed from the attachment means. In other examples, the kit may comprise a second attachment means different from the attachment means. In some embodiments, the kit may comprise second piston means different from the piston means.

In another aspect, a kit comprises a base and instructions for using the base. For example, the base in the kit may comprise a planar member configured to engage a planar surface of a first workpiece, the base further comprising an angled member coupled to the planar member, the angled member configured to engage a first planar surface of a second workpiece positioned adjacent to the first workpiece, the angled member further configured to receive an attachment device. The instructions may comprise how to use the base with an attachment device to dispense a fastener from the attachment device to couple the first workpiece to the second workpiece.

In some instances, the kit comprises a first handle configured to reversibly couple to the base, in which the first handle comprises a first internal valve configured to fluidically couple to an external pressure source, in which the first handle further comprises a first plunger configured to actuate the first internal valve to an open position after movement of the first plunger from a first position to a second position and to close the first internal valve after release of the first plunger to the first position. In other examples, the kit comprises a second handle configured to reversibly couple to the base, in which the second handle comprises a second internal valve configured to fluidically couple to the first internal valve of the first handle upon movement of the first plunger of the first handle to the second position of the first internal valve, in which the second handle further comprises a second plunger configured to actuate the second internal valve to an open position after movement of the second plunger from a first position to a second position and to close the second internal valve after release of the second plunger to the first position, wherein the second internal valve is configured to fluidically couple to the attachment device when the second plunger is moved to the second position to actuate the attachment device and insert a fastener into the first and second workpieces to hold them together. In some configurations, the kit comprises a pneumatic cylinder configured to reversible couple to the planar member of the base and fluidically couple to the first internal valve of the first handle upon movement of the first plunger of the first handle from the first position to the second position, the pneumatic cylinder configured to engage a second planar surface of the second workpiece when the first plunger is moved from the first position to the second position. In other examples, the kit comprises the attachment device and optionally one or more fasteners.

Additional features, aspect, examples and embodiments are described in more detail below.

BRIEF DESCRIPTION OF THE FIGURES

Certain embodiments of the devices and systems are described with reference to the accompanying figures in which.

It will be recognized by the person of ordinary skill in the art, given the benefit of this disclosure, that certain dimensions or features of the components of the devices may have been enlarged, distorted or shown in an otherwise unconventional or non-proportional manner to provide a more user friendly version of the figures. In addition, the exact length and width of the base, piston means, tubing, etc. described herein may vary depending, for example, on the size of the device, the intended use of the device and other considerations.

DETAILED DESCRIPTION

Certain embodiments are described below with reference to singular and plural terms in order to provide a user friendly description of the technology disclosed herein. These terms are used for convenience purposes only and are not intended to limit the devices, methods and systems described herein. The devices described herein can be used with a pressure source such as, for example, an air compressor to provide sufficient force to insert a fastener. The exact force used may depend on the thickness of the workpieces, the composition of the workpieces, the dimensions of the fastener and the like. In some examples, the air compressor may provide a pressure between about 75 psi and about 120 psi, more particularly, between about 80 psi and about 110 psi or about 85 psi to about 95 psi. Other pressures can also be selected by the person of ordinary skill in the art, given the benefit of this disclosure.

Figure 1:
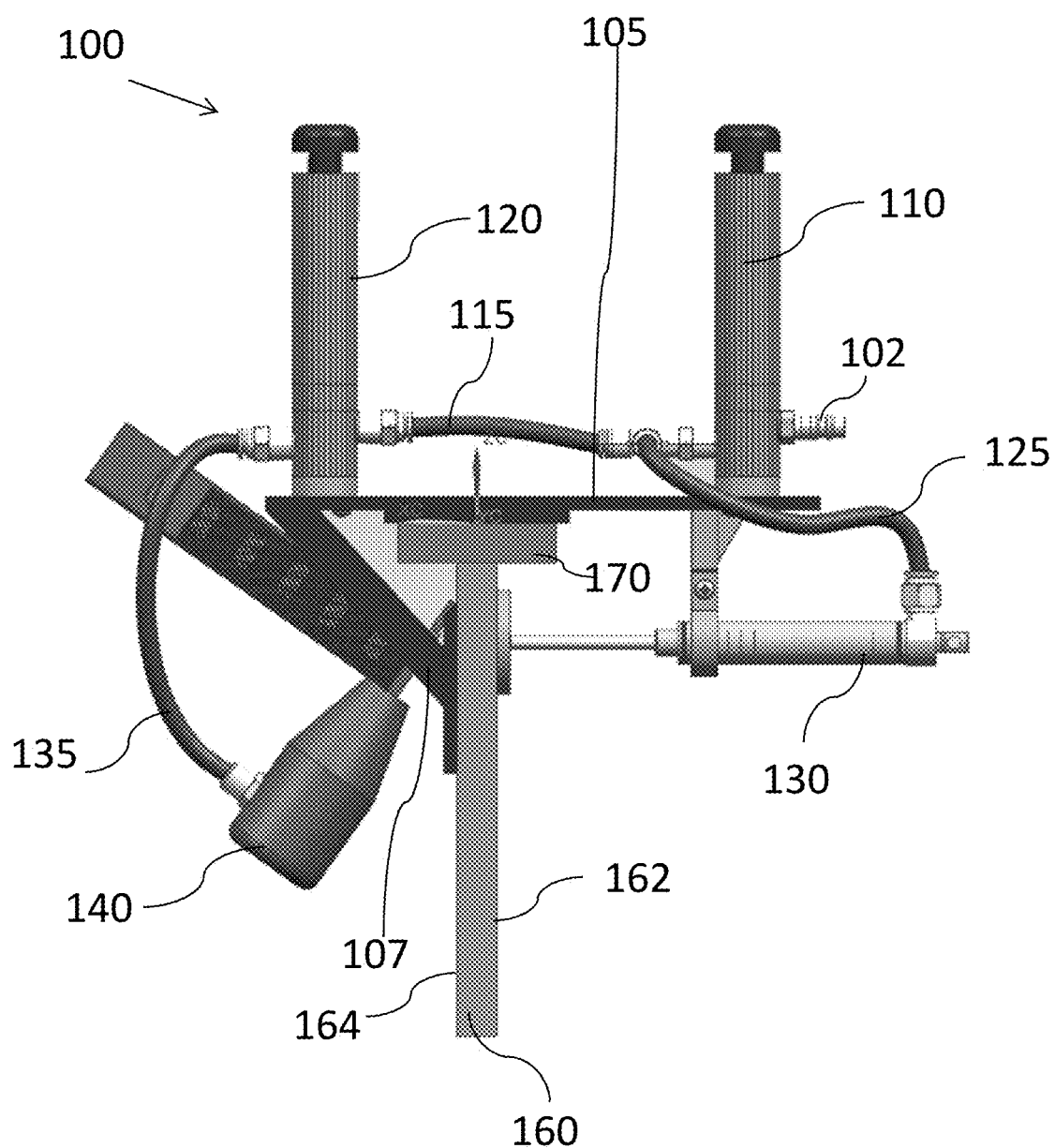
FIG. 1 is a perspective view of a certain components of a device that can be used to couple two or more workpieces to each other, in accordance with certain examples.

In certain configurations and referring to FIG. 1, a device 100 is shown positioned on a first workpiece 170 and a second workpiece 160. The device 100 comprises first actuating means 110, which can be fluidically coupled to a pressure source (not shown) such as, for example, a compressor, through a coupler 102. The first actuating means 110 is fluidically coupled to a second actuating means 120 through a fluid line 115. Each of the first and second actuating means 110, 120 is coupled to a planar member 105 of a base. The planar surface 105 of the base is shown as resting against a top, planar surface of the workpiece 170. The device 100 further comprises piston means 130 fluidically coupled to the first actuating means 110 through a fluid line 125. The device 100 also comprises an attachment device 140 coupled to an angled member 107 of the base and fluidically coupled to the second actuating means 120 through a fluid line 135. The angled member 107 of the base rests against a second surface 164 of a second workpiece 160, which is separate from the workpiece 170 prior to coupling the workpieces 160, 170 to each other. If desired, the end user can assemble the actuating means 110, 120, the piston means 130 and the attachment means 140 to the base prior to use. The attachment means 140 in particular may be provided by the end user as the end user may have an existing pneumatic gun which can be used.

In some instances, in use of the device 100, the first workpiece 160 and the second workpiece 170 are positioned to be substantially orthogonal to each other as shown in FIG. 1. If desired, however, the workpiece 160 may not be flat at a surface where it couples to the workpiece 170, e.g., it can be angled to couple the workpiece 160 to the workpiece 170 at some angle other than about ninety degrees. One workpiece may be placed in contact with the other workpiece through an adhesive, for example. In a typical use, it is the adhesive which provides the bonding strength to permanently couple the workpieces 160, 170 to each other. To retain the coupling of the workpieces 160, 170 until the adhesive has time to cure, the device 100 may be used to provide a fastener through the workpieces 160, 170. For example, the device 100 can be placed on assembled workpieces 160, 170 such that the flat planar member 105 of the base contacts the workpiece 170 and the angled member 107 of the base contacts one surface 164 of the workpiece 160. The actuating means 110 can be actuated to permit gas to flow from a compressor (not shown) into the actuating means 110 and to the piston means 130 through the fluid line 125. The piston means 130 is then pressed against an opposite surface 162 of the workpiece 160 with sufficient force to hold the workpieces 160, 170 in a suitable position against each other. The biasing force provided by the angled member 107 and the piston means 130 acts to keep the workpiece 170 from moving. Similarly, the force provided by the planar member 105 of the base acts to keep the workpiece 160 in contact with the workpiece 170. The second actuating means 120 can then be actuated to permit gas to flow through the fluid line 135 to the attachment device 140. Actuation of the actuating means 120 causes the attachment device 140 to dispense a fastener, e.g., staple, brad, screw, nail, etc. through the workpiece 160 at an angle. The fastener also penetrates into the workpiece 170 to couple the two workpieces 160, 170 to each other and retain the workpieces in the assembled orientation to permit the adhesive to cure. Using the device 100, two workpieces can be coupled to each other without the use of biscuit joinery and/or without the use of pocket screws.

In some examples, after a single fastener has been dispensed from the attachment device 140, the actuating means 110 may be deactivated, which causes the piston means 130 to release the force applied to the surface 162 of the workpiece 160. This operation allows the device 100 to be moved to a different site of the workpieces 160, 170, e.g., further into the page of the figure or out of the page of the figure, to dispense another fastener or permits removal of the device 100 from the assembled workpieces 160, 170 if desired. In other examples, the device 100 can be configured such that a single activation of the actuation means 120 results in dispensing of a single fastener, and the actuation means can be reset prior to dispensing of a second fastener. For example, release of a button of the actuation means 120 can cause pressure in the system to build up again and permit dispensing of an additional fastener once the actuation means 120 is re-actuated.

In certain embodiments, the device may comprise a single actuating means which is designed to activate both the piston means and the attachment device. For example, one or more valves can be present in the fluid lines such that actuation of the single actuation means first permits the piston means to contact the surface of a workpiece and then permits dispensing of the fastener. The valves can be controlled with a microprocessor or other device such that the valve within the attachment device fluid circuit is not actuated until the piston means contacts the surface of the workpiece. Use of a single actuating means simplifies overall device construction and reduces overall cost. If desired, the piston means may comprise a pressure sensor, and once the pressure sensor contacts the surface 162 of the workpiece 160, air can be provided to the attachment device 140 through a suitable coupler or valve, e.g., a 2-way valve or a 3-way valve.

Figure 2:
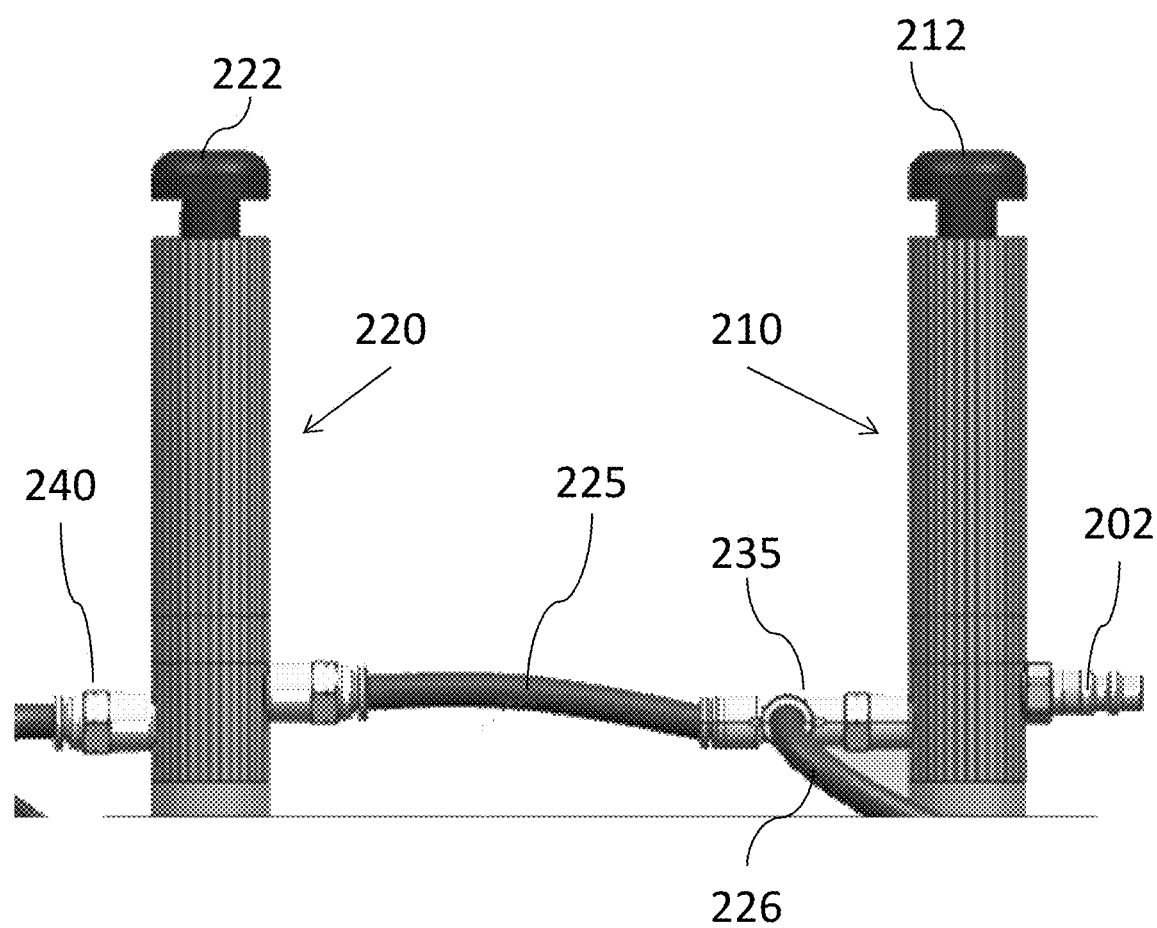
FIG. 2 is an illustration of two actuation means, in accordance with certain examples.

In some examples, one or both of the actuating means of the device can each be configured as a handle comprising a plunger which comprises a button and plunger shaft which can be depressed or moved to permit gas to flow to another component of the device. For example and referring to FIG. 2, a first handle 210 comprises a plunger 212 which can be depressed to permit gas to flow into the handle 210 through a coupler 202. When the plunger 212 is in the non-depressed state, e.g., in a first position, gas from a compressor (not shown) or other pressure source does not enter into the fluid lines 225 or 226. When the plunger 212 is depressed, e.g., moved to a second position, gas may then flow into the handle 210 and into the fluid lines 225, 226 through a coupler 235, which may be a T-shaped coupler, a valve, etc. Gas will then flow to a second handle 220. The second handle 220 also comprises a plunger 222. In the non-depressed state of the plunger 222 of the second handle 220, e.g., in a first position of the plunger 222 of the second handle 220, the plunger 222 prohibits gas flow into a fluid line 240. When the plunger 222 is depressed, e.g., moved to a second position, gas can then flow into the fluid line 240 and downstream to another component, e.g., an attachment device. The serial arrangement of the handles 210, 220 provides desirable safety features. For example, where the handle 220 is fluidically coupled to a downstream attachment device, the attachment device may not be actuated unless both plungers 212, 222 are moved to the second position, e.g., are depressed. Further, depression of the plunger 222 without depression of the plunger 212 does not result in activation of any downstream attachment device. This configuration prevents accidental actuation of the attachment device. In use of the two handles, a user would grasp the handle 210 with one hand and the handle 220 with the other hand. The plunger 212 would be pressed and held first, and then the plunger 222 can be pressed to provide gas to a downstream attachment device to dispense a fastener. The plunger 222 can then be released to permit gas pressure to build back up. Once the pressure rises to a sufficient level, the plunger 222 can then be depressed to release another fastener as long as the plunger 212 is still depressed. If at any time the plunger 212 is released, sufficient gas pressure is not available when the plunger 222 is depressed to provide enough downstream gas pressure to dispense a fastener from a downstream attachment device. Depression of the plunger 212 also permits gas to flow to the piston means (not shown) through a fluid line 226 to assist in retaining the workpieces at the proper orientation relative to each other.

Figure 3A:
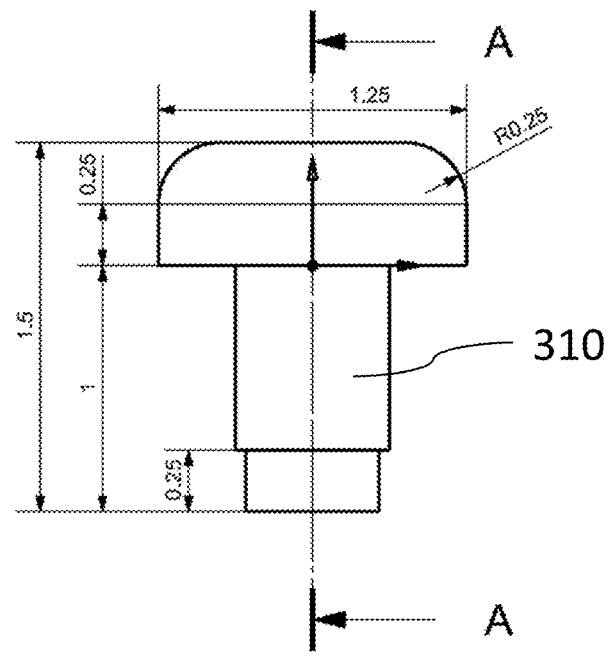
FIGS. 3A and 3B are illustrations of a button of a plunger, in accordance with certain examples.
Figure 3B:
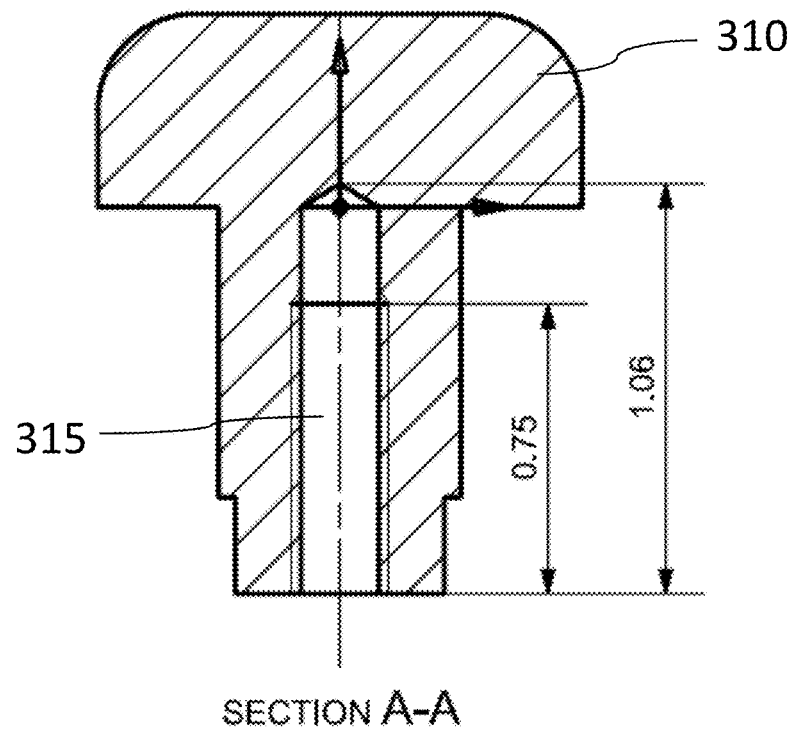

In certain configurations and referring to FIGS. 3A and 3B, cross-sections of one portion of a plunger are shown. The plunger may comprise a button 310 that can couple to a plunger shaft, as discussed below in connection with FIGS. 4A and 4B. The button 310 can be sized and arranged to permit a single digit, e.g., a finger or thumb, to contact and press the button 310. A cross section is shown in FIG. 3B, which shows the button 310 may comprise a central opening 315 which can couple to a shaft of the plunger. The plunger shaft may fit into the opening 315 through a friction fit or can be coupled to the button 310 using pins, adhesives, welds or the like. When connected, depression of the button 310 causes movement of the plunger shaft in the same direction. For example, downward depression of the button 310 causes a downward movement of the plunger shaft, which can actuate a valve or other means to a different state or position. While the button 310 is shown as comprising a generally circular shape when viewed from the top, other shapes such as rectangular, triangular, ovoid, etc. can be present instead. Similarly, where two or more plungers are present, the buttons needs not have the same shape. The button 310 may be produced using suitable materials including, but not limited to, metals, plastics, elastomeric materials and the like. The button 310 can also be textured to prohibit slipping of a user's finger or thumb off of the button 310 during use. The exact dimension of the button may vary from about 0.5 inches tall to about 1.5 inches tall and about 0.5 inches wide to about 2 inches wide (when viewed from the top)

Figures 4A, 4B:
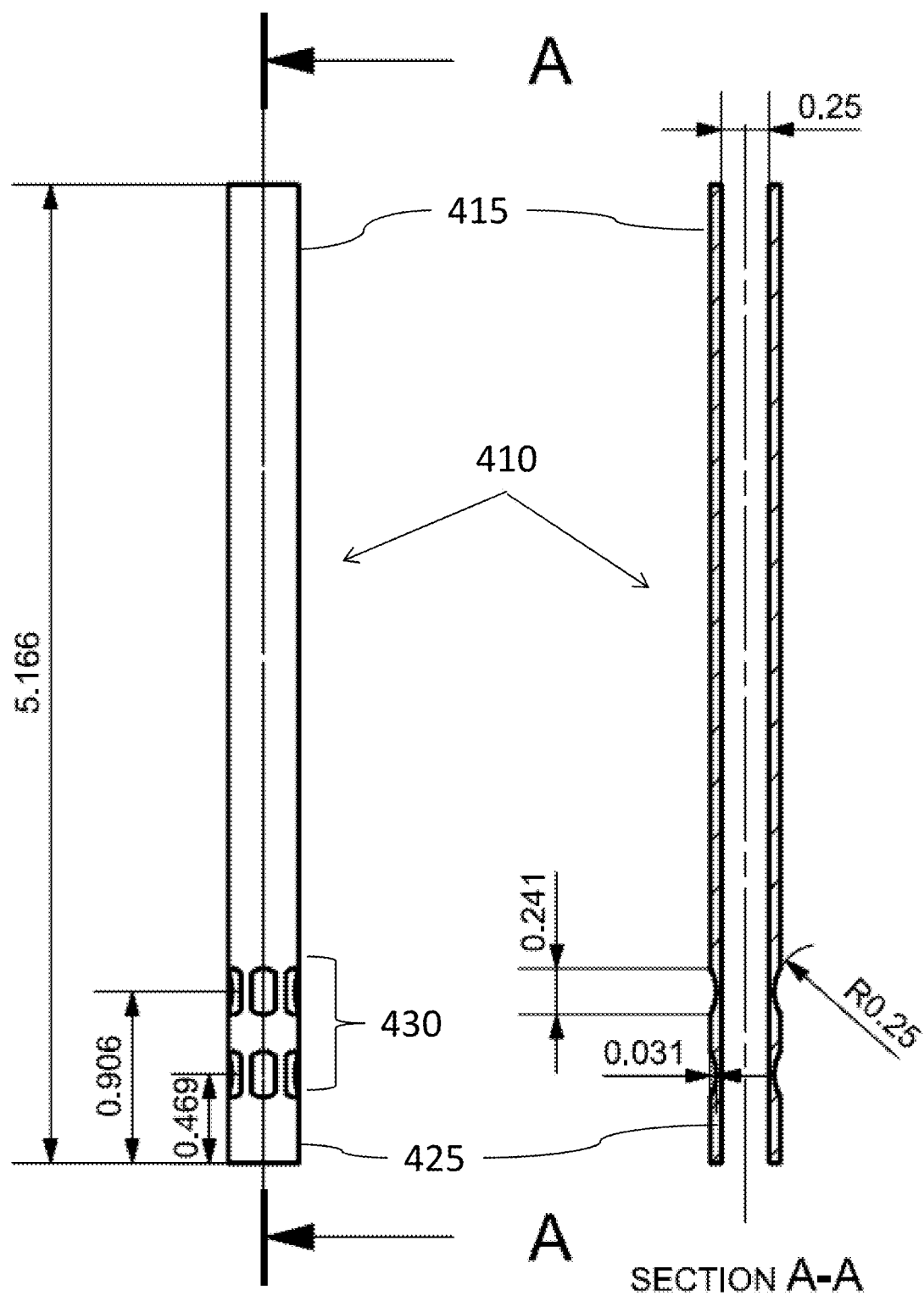
FIGS. 4A and 4B are illustrations of plunger shafts of a plunger, in accordance with certain examples.

In some embodiments and referring to FIGS. 4A and 4B, a plunger shaft 410 which can be used with the button 310 is shown. The plunger shaft 410 comprises a first end 415 and a second end 425. The first end 415 couples to a button, and the second end 425 is configured for use with a handle core as noted in more detail below. The second end 425 comprises apertures, collectively 430, which permit gas to flow through the handle comprising the plunger shaft 410. For example, the apertures can be designed to enhance fluidic coupling of a downstream component once the plunger shaft is depressed or can be used to "bleed off" air from the device once the plunger shaft is depressed. In some examples, depression of the plunger shaft to actuate a downstream device can result in pressure loss through the apertures 430. This configuration enhances safety by permitting the user to release the plunger to a resting position so pressure in the system can rebuild. In other instances, the apertures 430 are designed for use with a handle comprising a 2-way valve or a 3-way valve. For example, depression of a button and the plunger shaft 410 actuates a 3-way valve to an open position to permit air to flow into the device. Release of the button causes the valve to return to an "off" state where no gas flows into the device past the handle. In some examples, depression activates the 3-way valve and causes pressure to be reduced in the system such that release of the button prior to dispensing of another fastener permits pressure to build back to a pre-depressed level. The plunger shaft 410 may be produced from metals, plastics or other materials. In some examples, the plunger shaft 410 is substantially rigid so that is does not flex to a substantial degree during depression of the plunger shaft 410. If desired, the plunger shaft 410 can be coated with one or more materials to prevent rusting or corrosion. While the cross-sectional shape of the plunger shaft 410 is shown as generally circular, other shapes such as square, rectangular, triangular, ovoid, etc. can be used instead. In some instances, the overall length of the plunger shaft can vary from about 4 inches to about 6 inches. If desired, the device may be packaged with plunger shafts of varying lengths to permit a user to adjust the distance which the plunger shaft can be depressed to actuate the device. Where two or more plungers are present, the plunger shafts need not have the same shape or length in different plungers. Further, the number of apertures may be different in different plunger shafts to alter the overall pressure provided downstream of a particular plunger.

In certain configurations, the button and plunger shaft can be machined or configured as a unitary piece or element. For example, the button and plunger can be machined from solid bar stock, or the button and plunger shaft can together by produced using injection molding or other thermoforming techniques. The apertures of the plunger shaft can be drilled, machined or otherwise produced in the unitary button/plunger shaft assembly. The plunger shaft can be sized and arranged to insert into a valve in a handle core as described in more detail herein.

Figure 5A:
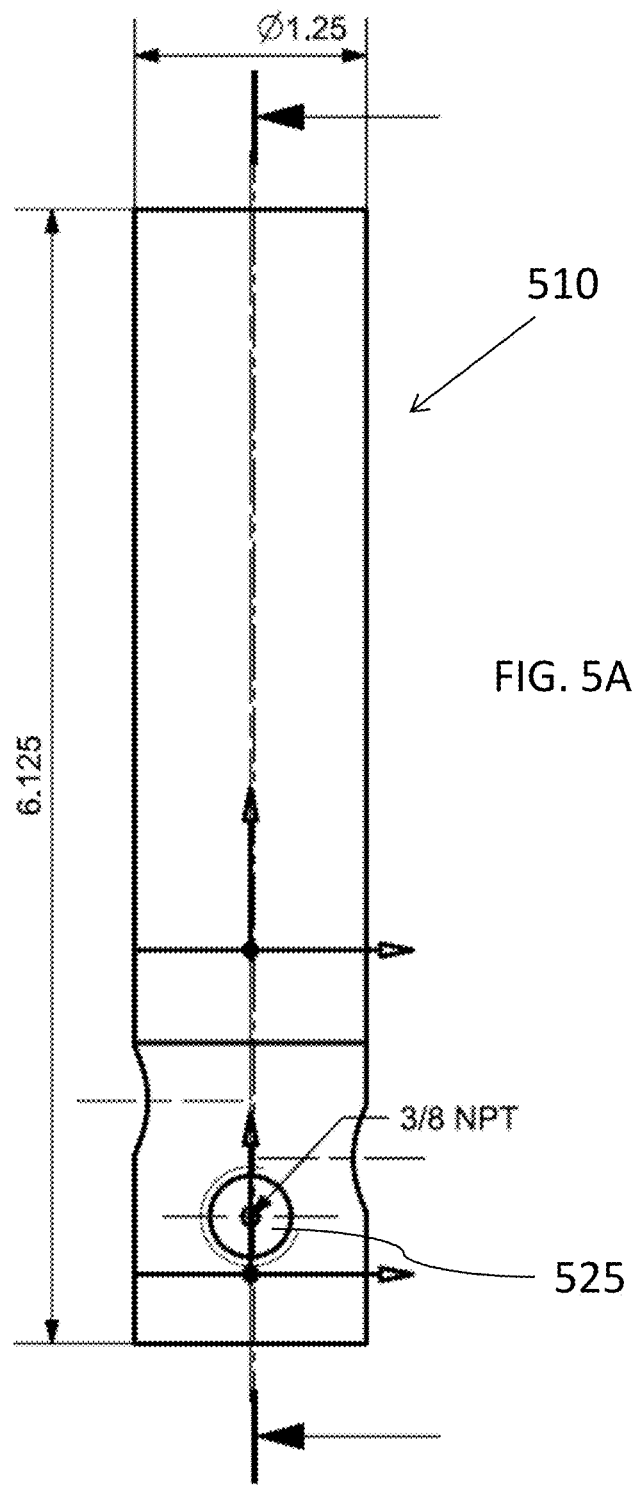
FIGS. 5A, 5B and 5C are illustrations of handle cores, in accordance with certain embodiments.
Figure 5B:
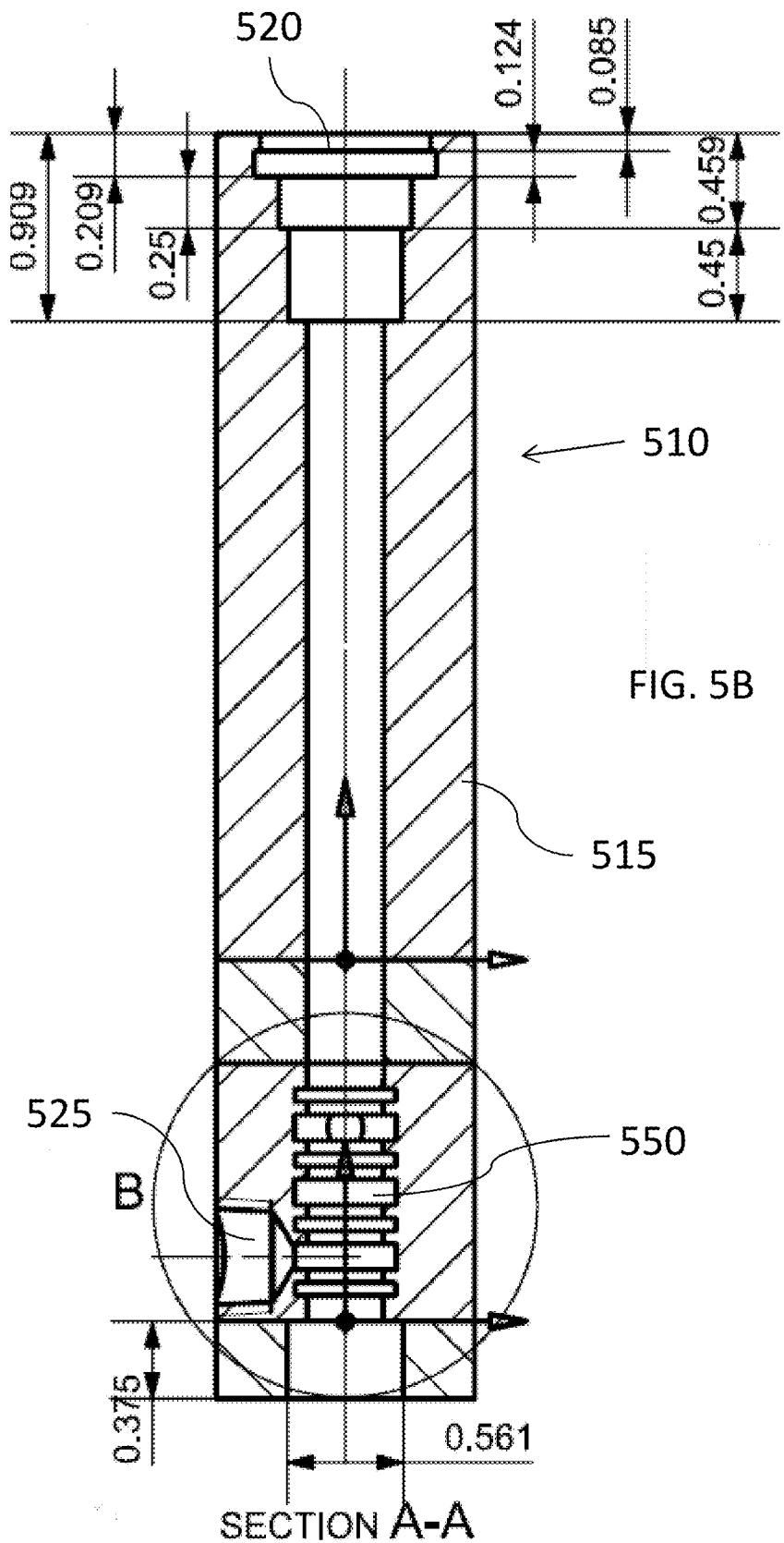
Figure 5C:
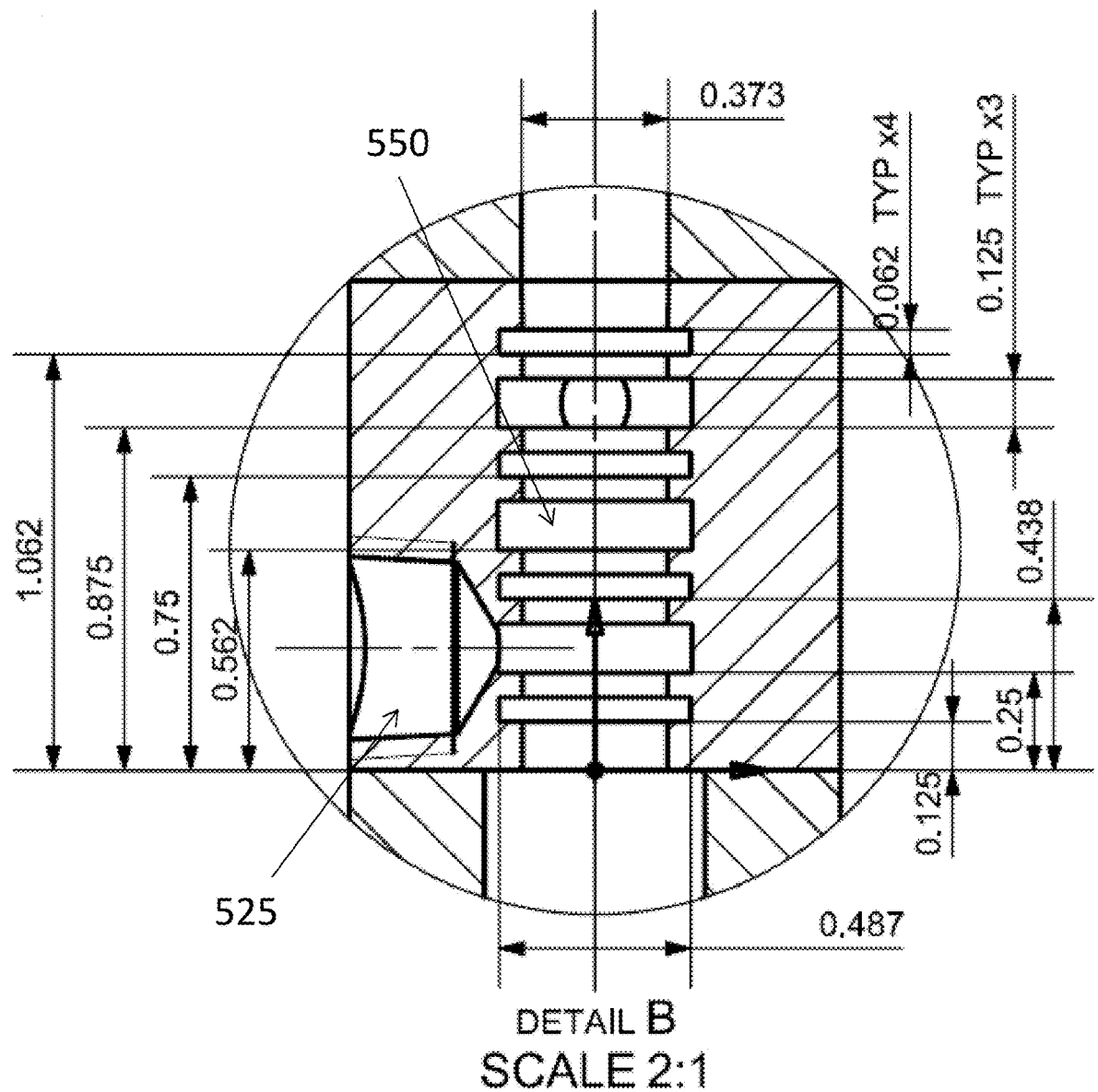

In some configurations and referring to FIGS. 5A-5C, the button/plunger shaft assembly can be constructed and arranged for insertion into a handle core 510. The handle core 510 comprises a suitable diameter and/or shape to receive the button/plunger shaft assembly and provide a substantially fluid tight seal if desired. In other examples, open space exists between outer surfaces of the plunger shaft and inner surfaces of the handle core 510. This open space can be used to "bleed off" air during use of the device. In some examples, the handle core 510 (see FIG. 5B) comprises a body 515 with a first port or opening 520 at one end, and one or more other opening or ports, such as opening 525, at an opposite end. In some examples, the first opening 520 is designed to receive a plunger. The opening 525 can be coupled to a compressor or to a downstream fluid line. As shown in FIG. 5C, the handle core 510 may comprise a 3-way valve 550 which can be used to fluidically couple/decouple the handle 510 from downstream components of the device. For example, depression of the button plunger assembly from a first position to a second position can actuate the 3-way valve from a closed position, where downstream components of the device are fluidically decoupled from the handle 510, to an open position where downstream components of the device are fluidically coupled to the handle 510 and any compressor or pressure source fluidically coupled to the handle 510. The open position of the valve 550 acts to pressurize the components downstream of the handle 510. Where two handles are arranged in series, depression of the plunger of the first handle actuates a first valve (2-way valve or 3-way valve) to an open position and depression of the plunger of the second handle actuates a second valve (2-way valve or 3-way valve) to an open position. When both valves are in the open position, a downstream attachment device can be pressurized, which acts to dispense a fastener from the attachment device. Dispensing of the fastener can also result in a pressure drop through the device. This pressure drop can be desirable to avoid dispensing of more than a single fastener from the attachment device. The plunger of the second handle can be released to permit pressure to build back up in the device to a suitable level prior to dispensing a second fastener. In some instances, the device can be designed so that both the plungers from the second handle and the first handle need to be released to permit pressure to build back up to a suitable level for dispensing another fastener. In the off state of the valves, air can flow into the handle core but can generally be prohibited from flowing to downstream components. A gasket, seal or other device can be present between the button/plunger shaft assembly and the handle core 510 to assist in retaining pressure within the handle core

510. In certain configurations, the valve can be pressed into the handle core 510 and may be retained through a friction fit or through mechanical means. If the valve fails, the old valve can be pressed out or removed and replaced with a new valve.

In some examples, the handle core 510 may comprise metals, plastic or other materials which can act to retain air pressure within the handle core 510. The handle core 510 is generally a solid body and can be produced using molding, casting, pouring or other techniques. In some instances, the handle core 510 is generally a cylindrical body with a length of about 4 inches to about 8 inches. While different handle cores may be present at different lengths, in some configurations the overall length of each handle of a device may be about the same. The outer diameter of the handle core 510 may range from about 0.5 inches to about 2 inches. Where openings are present in the handle core 510, the openings may be about ¼ inches, ⅜ inches, ½ inches, ⅝ inches, ¾ inches in diameter or other dimensions which are generally available and used to connect tubing to pneumatic couplers. In some instances, one or more O-rings or gaskets can be present to facilitate a seal between one or more ports of the valve and another component, e.g., between a port of the valve and the plunger shaft.

Figure 6:
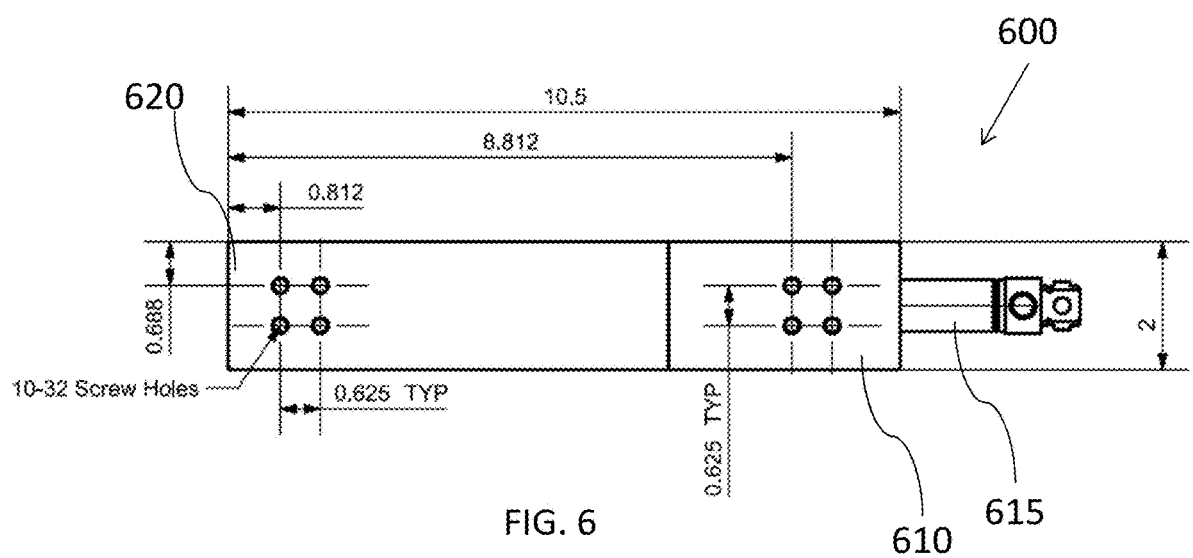
FIG. 6 is an illustration of piston means, in accordance with certain examples.
Figure 7:
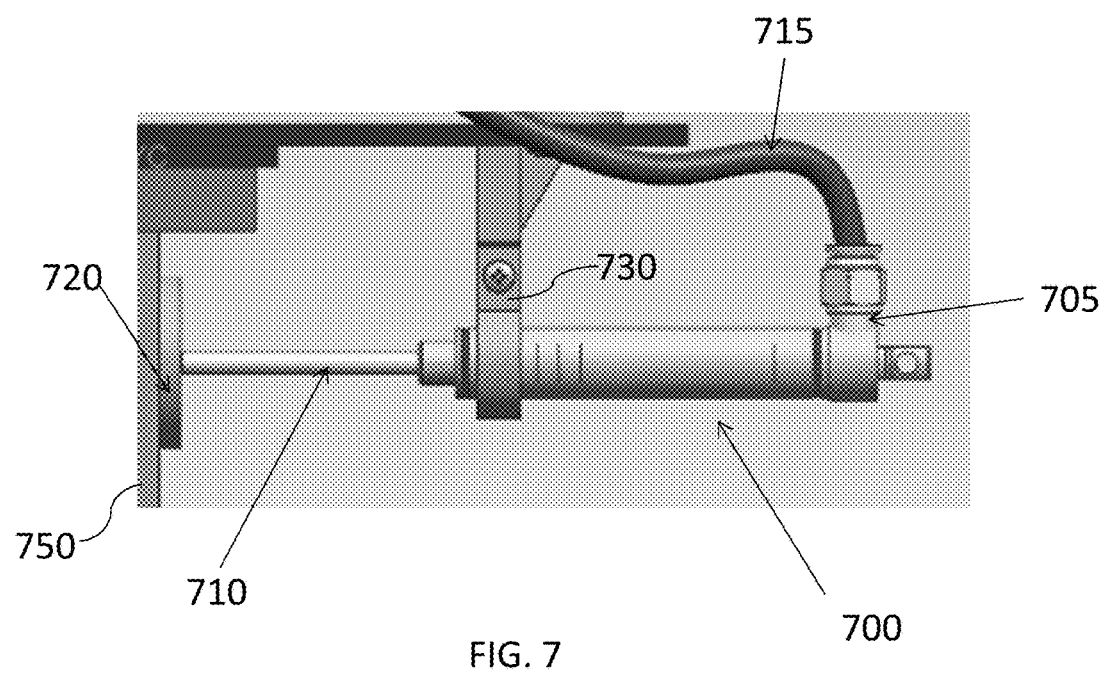
FIG. 7 is an illustration of piston means coupled to a base, in accordance with certain examples.

In some configurations, the devices described herein may also comprise piston means which can be used with the base to hold one of the workpieces. The piston means can take the form of a cylinder such as a pneumatic cylinder, hydraulic cylinder or other cylinders which comprise a piston which can be extended or retracted with application of pressure. Referring to FIG. 6, a pneumatic cylinder 600 is shown comprising a first end 610 and a second end 620. A piston 615 can be positioned within the body of the cylinder 600 and can be actuated to different positions depending on the pressure provided to the cylinder 600. In the off state of the device, substantially no pressure is provided to the cylinder 600 and the piston 615 of the device remains in a retracted state (as shown in FIG. 6). In an on state of the device, pressure is provided to the cylinder 600 and the piston within the cylinder 600 is extended until it contacts a workpiece (see piston 710 in FIG. 7). The piston means may generally be circular with a diameter of about 0.25 inches to about 1.25 inches and a length of about 8 inches to about 12 inches. The piston means may be damped such that movement of the piston means to contact the workpiece may take about one-quarter of a second to about two seconds until it engages the workpiece. Slower movement of the piston means can reduce the likelihood that contact will damage the workpiece.

In some embodiments, the piston means may take the form of a cylinder that comprises suitable fittings or couplers to permit coupling of a pressure source and/or mechanical mounts. For example and referring to FIG. 7, a cylinder 700 may comprise a port 705 that can fluidically couple to a fluid line 715. The cylinder 700 comprises a piston 710 comprising a planar member 720 designed to contact a surface of a workpiece 750. Application of pressure through the fluid line 715 and into the port 705 results in movement of the piston 710 and the planar member 720 toward a surface of the workpiece 750. Removal of the pressure causes the piston 710 and planar member 720 to move back through the cylinder 700 and away from the surface of the workpiece 750.

Figure 8A:
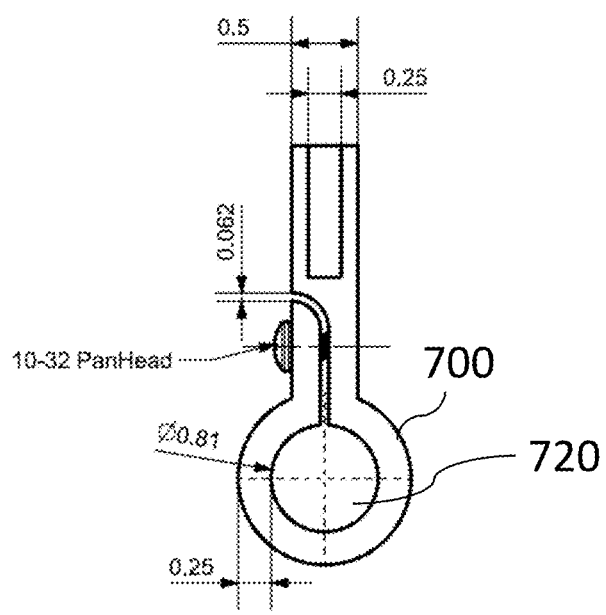
FIGS. 8A and 8B are illustrations of certain components used with piston means, in accordance with certain configurations.

In some examples, one configuration of a planar member 720 of the piston means is shown in FIG. 8A. The planar member 720 may comprise a generally flat surface which can engage one piece of a workpiece. If the workpiece is angled, then the planar member 720 can also be angled so that the member 720 makes surface-to-surface contact with that side of the workpiece. While the planar member 720 is shown as having a generally circular cross-section in FIG. 8A, other shapes such as rectangular, square, triangular, etc. could be used instead. The member 720 may also be split into two or more separate components coupled to the piston shaft 710 to increase the overall surface area contact with the workpiece. The exact material used in the member 720 may vary from plastics, metals, elastomers and the like. In some instances, the member 720 may be produced from, or comprise, a non-marring material, e.g., chrome, polytetrafluoroethylene, polycarbonate, glass, etc. to prevent damage to the surface of the workpiece. The planar member 720 may comprise non-marring coatings, replaceable sleeves or covers and/or may comprise bosses or standoffs on a planar surface to facilitate holding of the workpiece in a proper position.

Figure 8B:
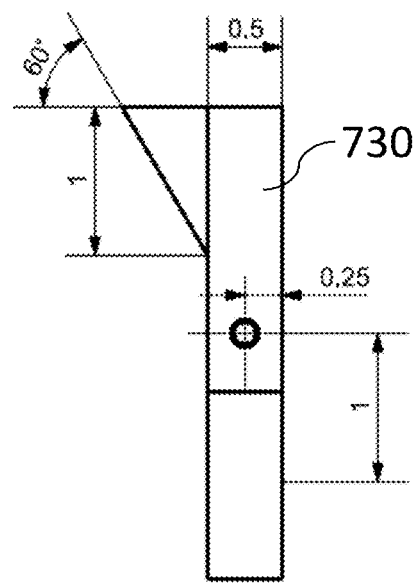

In certain embodiments, the piston means may be coupled to the base through a suitable mount or coupler. Referring to FIG. 8B, a mount 730 is shown that can couple to one section of a cylinder of a piston means. The mount 730 can be coupled to the base using screws, bolts, rivets, etc. or may reversibly couple to the base through slots, cams or the like to permit removal or relocation of the cylinder at a particular position of the base. In some examples, the mount 730 is designed to position a longitudinal axis of the cylinder to be substantially parallel to the base such that actuation of the cylinder results in extension of the piston shaft 710 and the planar member 720 in a substantially orthogonal direction to the mount 730 and in a substantially parallel direction to the planar member of the base. This configurations promotes an in and out movement of the planar member 720 at a fixed angle relative to the planar member of the base of the device. In some examples, the mount 730 may comprise a length of about 2 inches to about 6 inches and a width of about 0.25 inches to about 2 inches. Where a larger cylinder is present, the overall size of the mount 730 can be increased to maintain the position of the cylinder during pressure application of the planar member 720.

Figure 9:
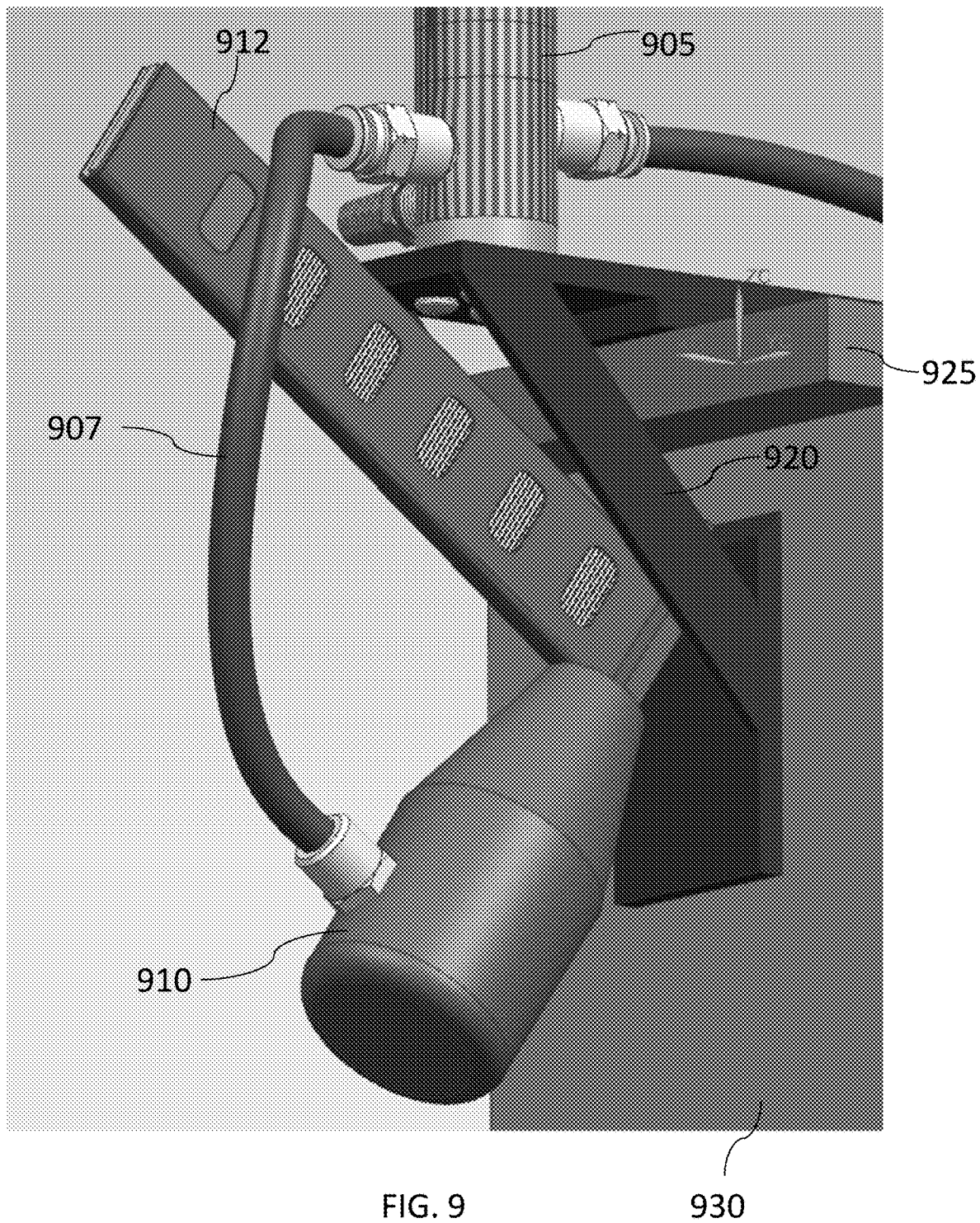
FIG. 9 is an illustration of an attachment device coupled to an angled member of a base, in accordance with certain examples.

In certain examples, the attachment device of the devices described herein may take numerous forms and typically is selected based on the type of fastener to be used. For example, the attachment device can take the form a pneumatic staple gun, a pneumatic nail gun, a pneumatic screw gun, a pneumatic brad gun or other devices which can receive air and use the received air to dispense a fastener. As noted herein, the attachment device is typically constructed and arranged to dispense a single fastener upon actuation of both actuation means of the device, e.g., upon depressing both button plunger assemblies of the handles of the device. In certain embodiments and referring to FIG. 9, an attachment device 910 is shown as being coupled to an angled member 920 of the base. The attachment device 910 is fluidically coupled to a handle 905 through a fluid line 907 when the handle 905 is actuated, e.g., by depression of the plunger of the handle 905. The attachment device comprises a magazine 912 comprising one or more fasteners. The magazine 912 is typically removable from the attachment device 910 to permit installation of a new magazine with additional fasteners once all fasteners in the first magazine have been used. As shown in FIG. 9, the attachment device 910 can be positioned such that dispensing of a fastener occurs at an angle relative to the workpiece 930. For example, the attachment device can dispense a fastener at a 30, 45 or 60 degree angle (or any angle between about 10 degrees to about 80 degrees) relative to the planar surface of the workpiece resting against the angled member 920. This dispensing angle causes the fastener to penetrate into the workpiece 930 and into another workpiece 925 to hold the two workpieces 925, 930 together for at least some period. As noted herein, an adhesive can be present at the joint between the workpieces 925, 930, and dispensing of a fastener into workpieces 925, 930 can act to hold the workpieces 925, 930 to each other until the adhesive can cure. While a single attachment device 910 is shown in FIG. 9, two or more side-by-side attachment devices could also be present and used to dispense two fasteners (one from each attachment device) at different positions along the joint of the workpieces 925, 930. In some examples, the attachment devices may be the same or may be different. Where the attachment devices are the same, they may dispense different types of fasteners at different sites of the joint between the workpieces 925, 930. For example, the attachment devices may dispense staples of differing lengths, one attachment device may dispense a staple and the other attachment device may dispense a nail, etc. In some embodiments, the attachment device 910 may be coupled to the angled member 920 of the base using suitable fasteners such as screws, bolts and the like. The position of the attachment device 910 can be fixed relative to the angled member 920 so that these components move together. In use of the attachment device, contacting of the workpiece 930 by the angled member 920 position the attachment device at an appropriate position without the need to adjust the attachment device position up or down. An end user may supply or provide their own attachment device, couple the attachment device to a base and any fluid lines/connection, and then couple the two workpieces to each other as described herein. In some examples, the attachment device may not have a safety or the safety device(s) may be switched off to permit proper functioning of the attachment device with other components described herein.

In some examples, the attachment device 910 may comprise one or more contact sensors as an additional safety means to prohibit actuation of the attachment device 910 when the angled member 920 is not in contact with a surface of the workpiece 930. For example, the contact sensor may act to mechanically block dispensing of the fastener unless the contact sensor senses contact with a surface. In other instances, the contact sensor can be fluidically coupled to a valve of the attachment device 910 to prohibit air flow into the attachment device unless physical contact with a surface exists. In other instances, the attachment device 910 may comprise an on-board microprocessor and on-board power source, e.g., a battery, fuel cell, etc. to monitor the state of the attachment device 910. For example, the attachment device, base or both may comprise a microprocessor which is configured to permit dispensing of a single fastener once air pressure from the handle 905 is received. The microprocessor can then be used to block further fastener dispensing until the air pressure within the attachment device 910 builds up to a suitable level. This configuration can permit proper insertion depth of the fastener into the workpieces 925, 930 and reduce the likelihood of fasteners protruding through the surfaces of one or both of the workpieces 925, 930. In other instances, the attachment device 910 may be free of any devices which require electrical power, and pneumatic pressure can be used to control the depth of insertion of any fasteners.

Figure 10:
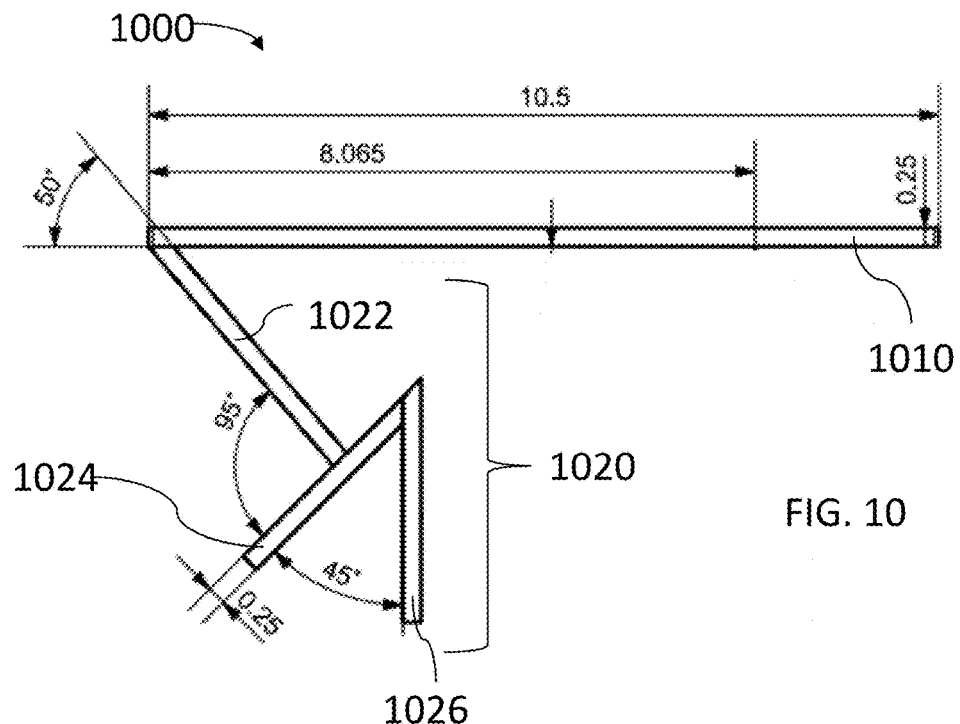
FIG. 10 is an illustration of a base, in accordance with certain embodiments.

In some configurations, the actuation means and piston means described herein are typically coupled to a base through threads, fasteners or both. In some examples, the base of the device may be provided separate from the other components, and an end-user can select and assemble desired actuation means, piston means and attachment means to the base to provide a functional device. In certain embodiments, one configuration of the base of the device is shown in FIG. 10. The base 1000 comprises a planar member 1010 coupled to an angled member 1020. The planar member 1010 is designed to receive the actuation means, e.g., handles on one surface, and the piston means, e.g., the pneumatic cylinder, on another surface. For example, the planar member 1010 may comprise threads which can receive corresponding threads on a handle to couple the handle to the base 1000. The planar member 1010 is also configured to contact a top planar surface of a first workpiece (not shown). As noted in connection with the member of the piston means, the planar member may comprise a non-marring surface or a non-marring coating that contacts a surface of a workpiece to avoid scratching the workpiece. The angled member 1020 comprises several different sections including a first angled section 1022 coupled to a second angled section 1024. The second angled section 1024 is coupled to a third section 1026, which can be constructed and arranged to be substantially orthogonal to the planar member 1010. In use of the base 1010, the section 1026 contacts a planar surface of a second workpiece. The section 1022 may comprise an aperture that can receive some portion of an attachment device (not shown) to position the attachment device dispensing head adjacent to one or both of the workpieces. The section 1024 may also comprise a mount, coupler or other means which can couple the attachment device to the angled member 1020. In some examples, the planar member 1010 of the base may have dimensions of about 8 inches to about 16 inches. The section 1022 of the angled member 1020 may couple to the planar member at an angle of about 30 degrees to about 70 degrees, e.g., at an angle of about 50 degrees. The section 1024 may couple to the section 1022 at an angle of about 60 degrees to about 120 degrees, e.g., about 95 degrees. The section 1026 can couple to the section 1024 at an angle of about thirty degrees to about sixty degrees, e.g., about 45 degrees. The length and width of the sections 1022, 1024 and 1026 can be the same or different, and illustrative lengths for each section range from about 2 inches to about 5 inches with widths ranging from about 0.5 inches to about 2 inches. The thickness of the sections 1022, 1024 and 1026 can also be the same or different and may each independently be about 0.1 inches to about 0.5 inches. The materials used in the planar member 1010 and the angled member 1020 can be the same or different, e.g., metals, plastics, etc., and the planar member 1010 can be integral with the angled member 1020, or the angled member 1020 can be a separate member which is coupled to the planar member 1010 through a fastener, slot, grooves, etc. In use, the planar member 1010 and the angled member 1020 generally move together.

Figure 11:
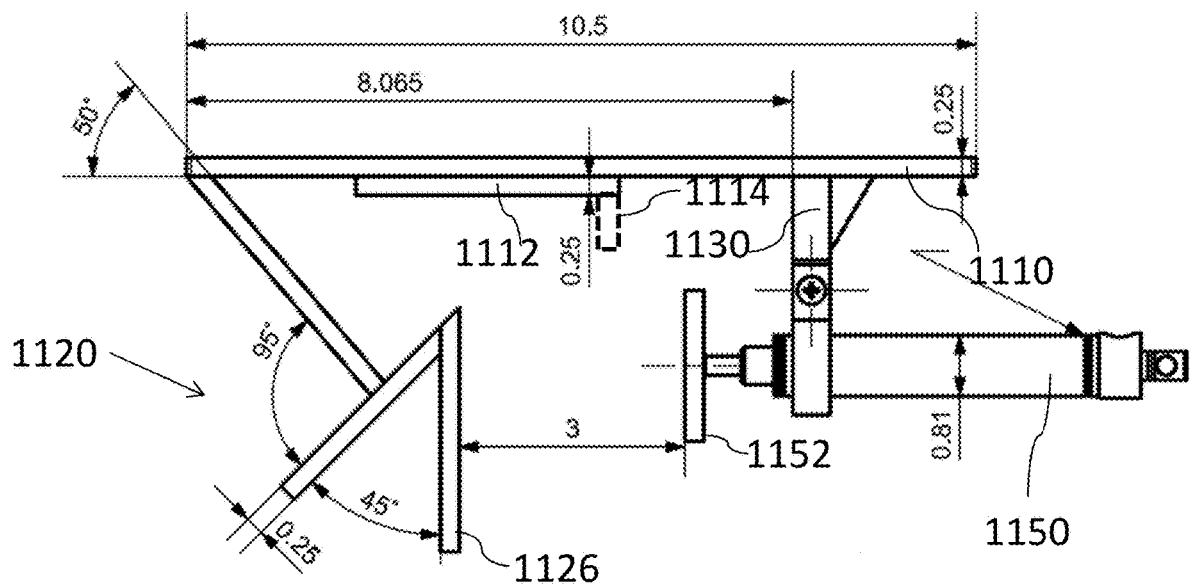
FIG. 11 is an illustration of a base coupled to piston means, in accordance with certain embodiments.

In certain embodiments, a base comprising piston means, e.g., a pneumatic or hydraulic cylinder, coupled to the base is shown in FIG. 11. The planar member 1110 of the base is coupled to the piston means 1150 through a mount 1130, In the off state of the piston means 1150, the section 1126 of the angled member 1120 can be positioned about 1 inch to about 5 inches from a head 1152 of the piston means 1150. The exact spacing between the section 1126 and the head 1152 in the off state of the device can be selected based on the thickness of a workpiece to be held between the section 1126 and the head 1152 when the piston means is actuated. For example, where 0.5 inch thick wood is to be held between the section 1126, the open space between the section 1126 and the head 1152 can be 2×, 3×, 4×, 5× or more of the thickness of the wood, e.g., the spacing may be 1 inch, 2 inches, 3 inches, 4 inches or 5 inches. The spacing between the section 1126 and the head 1152 in the off state of the device is desirably large enough to permit the device to be positioned around the workpieces but not so large as to require too much movement of the head 1152 after actuation of the piston means 1150. In some examples, the mount 1130 may be adjustable side to side to position the head 1152 at a suitable position in the off state of the device. In the configuration shown in FIG. 11, the planar member 1110 of the base comprises a raised section 1112 to reduce the overall space between a second workpiece and the base. The exact thickness of the section 1112 may vary from about 0.1 inches to about 1 inch, e.g., about 0.25 inches or about 0.5 inches. The length of the section 1112 can be selected to be about the same, greater than or less than a length of the workpiece that is contacted by the planar member 1110. The section 1112 may also comprise an optional stop 1114 which projects downward in a generally orthogonal direction to position the planar member 1110 at a suitable position relative to a workpiece contacting the bottom surface of the raised section 1112. The section 1112 may also comprise a non-marring surface or coating to prevent damage to the surface of the workpiece.

Figure 12A:
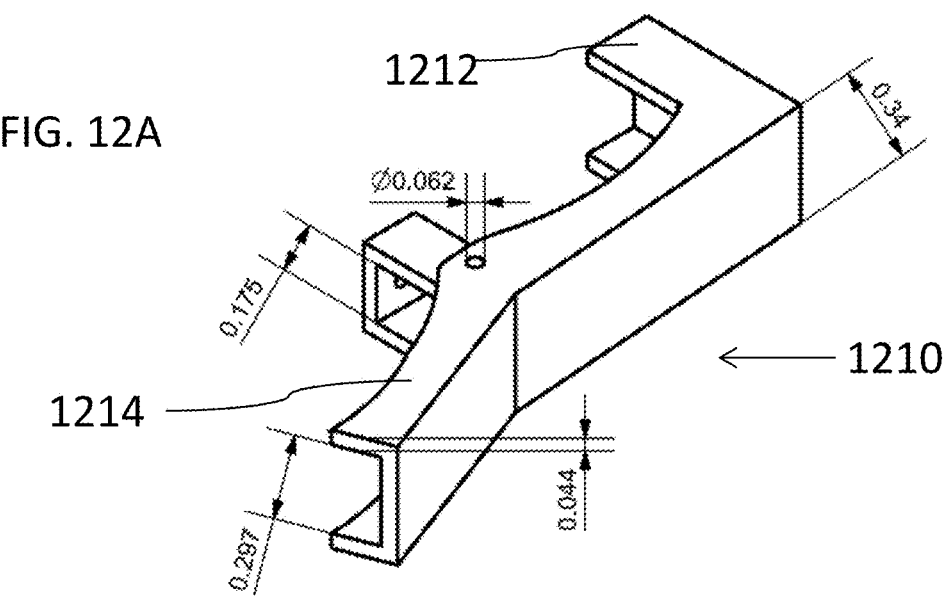
FIGS. 12A are 12B are illustrations of plunger blocks, in accordance with certain examples.
Figure 12B:
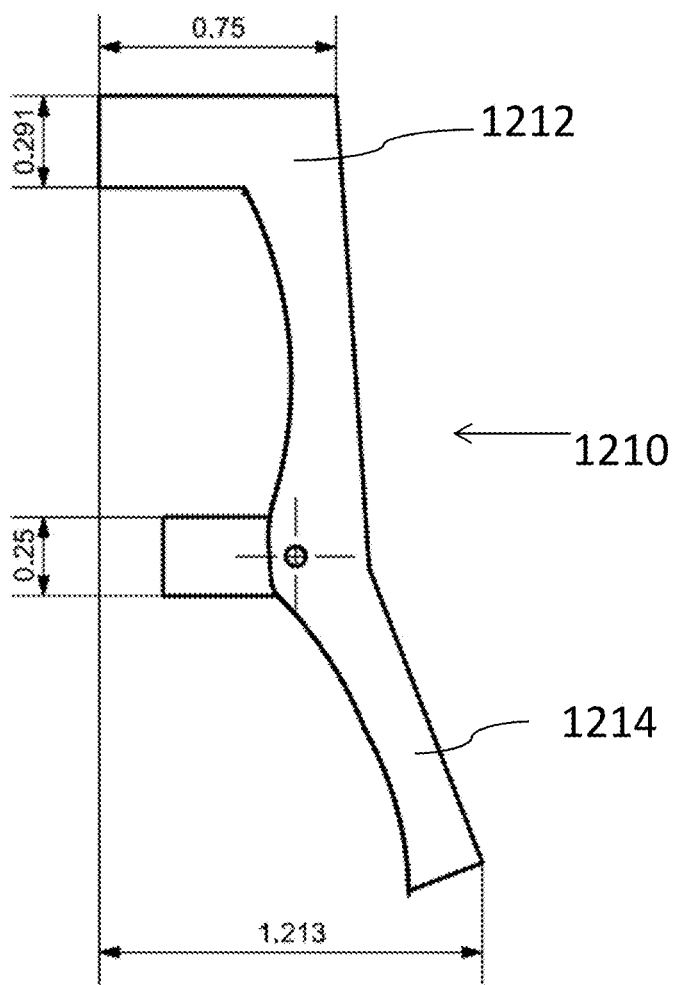

In certain configurations, the actuation means described herein, e.g., handles, may comprise one or more safety features which prohibit depression of the plunger. Referring to FIGS. 12A and 12B, a safety plunger block 1210 is shown. The safety plunger block comprises a top section 1212 which acts as a mechanical stop and engages a button (not shown) at some portion of a lower surface. When the plunger block 1210 is in a non-depressed state, the section 1212 inserts between an upper portion of a handle and a lower portion of the button and acts to prohibit depression of the button. A user can press the section 1214 of the plunger block 1210 to permit depression of the button of the actuation means. The plunger block 1210 is typically spring-loaded to require a user to hold the block 1210 down at a section 1214 to permit accidental actuation of the plunger of the actuation means. Where two actuation means are present, e.g., two handles, each handle may comprise a plunger block 1210 or only one of the handles may comprise a plunger block 1210. For example, in some configurations only a second handle fluidically coupled to an attachment device when a plunger is pressed may comprise a plunger block or only a first handle fluidically coupled to piston means when a plunger is pressed may comprise a plunger block. The plunger block may comprise metals, plastic, coatings, etc. and may be sized and arranged to have a length of about 1 inch to about 4 inches and a width of about 0.5 inches to about 2 inches. The plunger block 1210 can couple to the handle through suitable fasteners including screws, bolts, rivets, etc. or through slots or grooves. In some examples, the plunger block can be integral to the handle.

In certain configurations, the devices described herein can be used to couple a wood cabinet face to a wood cabinet frame structure. For example, wood cabinets such as kitchen cabinets, bathroom cabinets, storage cabinets, etc. typically comprise a cabinet structure which attaches to a wall, floor, ceiling, etc., and a finished face which provides a viewed and aesthetically pleasing surface. Conventional methods used to attach cabinet faces to a cabinet frame structure include the use of pocket screws or biscuit joinery, both of which are time consuming Using the devices described herein, cabinet faces can be attached in less than 30 seconds to a cabinet frame structure without the need to use pocket screws or biscuit joinery.

Figure 13:
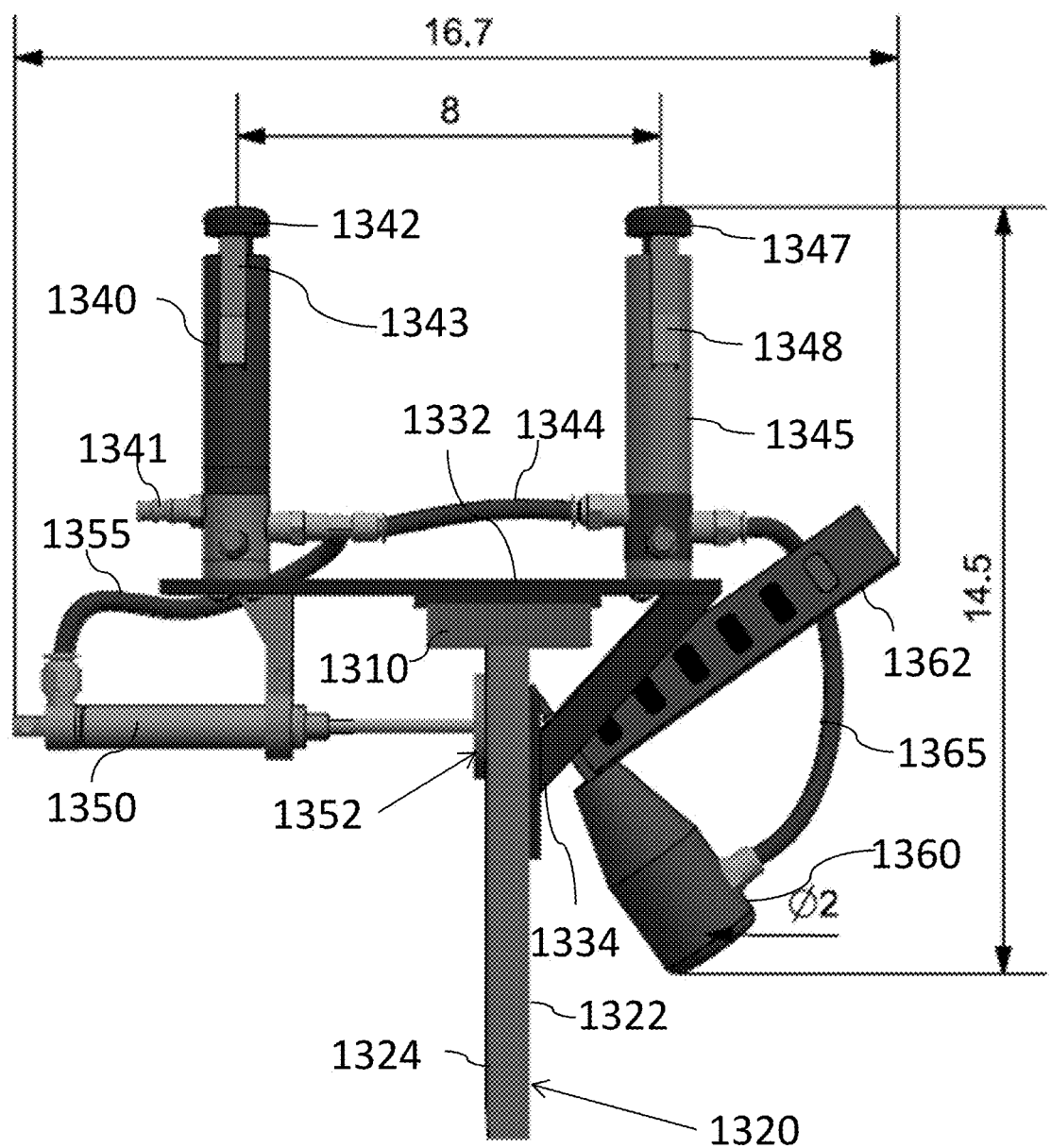
FIG. 13 is an illustration of a device that can be used to couple a first workpiece, e.g., cabinet face frame, to a second workpiece, e.g., a cabinet structure, in accordance with certain embodiments.

Referring to FIG. 13, a device is shown positioned around a cabinet face 1310 and one section of a cabinet frame structure 1320. A planar member 1332 of a base contacts an outer surface of the cabinet face 1310. An angled member 1334 of the base contacts a first surface 1322 of the cabinet structure 1320. A head 1352 of the piston means 1350, e.g., a pneumatic cylinder, contacts a second surface 1324 of the cabinet structure 1320. A first actuation means 1340, e.g., a handle assembly, comprises a first plunger 1342 and a plunger block 1343, and a second actuation means 1345, e.g., a handle assembly, comprises a second plunger 1347 and a plunger block 1348. The device also comprises an attachment device 1360 coupled to the angled member 1334 of the base. The attachment device 1360 comprises a magazine 1362 comprising a plurality of fasteners. The first actuation means 1340 is fluidically coupled to an air compressor (not shown) through a first port 1341. The first actuation means 1340 is also fluidically coupled to the piston means 1350 through a fluid line 1355 when the first plunger 1342 is depressed. The first actuation means 1340 is also fluidically coupled to the second actuation means 1345 through a fluid line 1344 when the first plunger 1342 is depressed. The plunger 1342 cannot be depressed until a lower section of the plunger block 1343 is pressed. The second actuation means 1345 is fluidically coupled to the attachment device 1360 when the second plunger 1347 is pressed through a fluid line 1365. The plunger 1347 cannot be depressed until a lower section of the plunger block 1348 is pressed. Pressing of the plunger 1347 causes a fastener to dispense from the magazine 1362 of the attachment device 1360 into the surface 1322 of the cabinet structure 1320 and into a lower surface of the cabinet frame 1310. For example, a staple can be inserted into the surface 1322 and into a back surface of the cabinet face frame 1310 without penetrating through an outer surface of the cabinet face frame 1310. The stapling holds the cabinet face frame 1310 to the cabinet structure 1320 until an adhesive between the cabinet structure and cabinet face frame can cure. If desired, the adhesive may be omitted, and the cabinet face frame can be fastened at multiple different sites using the devices described herein.

In certain embodiments, the devices described herein can be used to couple wood sections of kitchen cabinets, recreational vehicle cabinets and the like. The devices can also be used to couple a countertop to a wooden cabinet structure positioned underneath the countertop For example, wood, plastic or stone countertops can be attached to cabinet structures using the devices described herein. In some examples, the device can be used to couple a decorative surface to an underlying support structure. For example, the device can be used to couple plastic, composite or wood paneling sections to wall studs by inserting the fasteners through the wall studs and back surfaces of the wood paneling sections. This configuration permits retention of the wood paneling without creating a front surface with fastener penetration. Where such wood paneling is fastened using the devices described herein, if desired the piston means may be omitted with only the base, attachment device and actuation means being present in the device.

In certain instances, the devices described herein may permit on-wall attachment of a face frame to a cabinet structure. For example, custom cabinet framing can be built on site and attached to a wall or other surface or may be "stick built" directly on the wall. The face frame can then be placed in contact with the custom cabinet framing and attached to the cabinet framing using one of the devices described herein. Further, existing cabinet face frames can be removed from cabinets and replaced with different types of wood, different color wood, etc. without the need to remove the entire cabinet frame from the wall.

In other configurations, the devices described herein can be used to couple two or more metal surfaces to each other. For example, actuation of the attachment device may cause a steel fastener to be dispensed from the device. The steel fastener can be used to position the device to permit a user to weld the devices to each other for permanent coupling. Metals such as, for example, aluminum, titanium, iron and the like can also be used with the devices described herein. Similarly, fiberboard or other non-wood or non-metal based substrates can be coupled to each other using the devices described herein.

In some instances, the device described herein can be used to blind staple exterior building structures to each other. For example, blind staples can be inserted into brick mold and then a door can be set into an opening. This arrangement permits finishing the trim from a back surface so the fastener is not viewable from the outside.

In certain configurations, additional devices or sensors can be used with the devices described herein. For example, a pressure sensor or rheostat can be present to adjust or monitor the pressure in the system. An upper plate positioned above the actuation means may be present to block any fasteners should they penetrate and exit both workpiece surfaces. In some instances, a separate curved section may be present and positioned above the planar member of the base. The curved section may comprise the actuation means, e.g., handle, and can be used to adjust the angle of the handles. For example, the curved section can be used to tilt the angle of the handles inward or outward for a more comfortable position when using the device. If desired, however, the handles could be coupled directly the planar member and tilted as well. One or more cameras can be coupled to the attachment device and/or angled member of the base to permit a user to view the fastening process and any fasteners to ensure the fastener has been inserted at a proper depth into the workpieces. The camera may comprise, for example, a screen coupled to the base and a fiber optic head coupled to the angled member to properly position the camera components. In other instances, the fiber optic head may only be present and a wireless device such as a Bluetooth device can wirelessly transmit the image from the fiber optic head to another device, e.g., a phone, tablet, laptop, etc. to permit monitoring of the fastening process.

In some examples, the devices described herein can be used to couple two or more workpieces without the use of any adhesive. For example, the ability to insert a fastener and then move the device to another position permits insertion of a plurality of fasteners in a rapid manner. Enough fasteners can be inserted into the workpieces such that no adhesive is used. In other examples, fasteners can be inserted through one surface of a workpiece with a spacing of about two inches apart, the device can be reversed, and the fasteners can be inserted through an opposite surface of the workpiece between the spaced fasteners inserted through the other surface.

Figure 14:
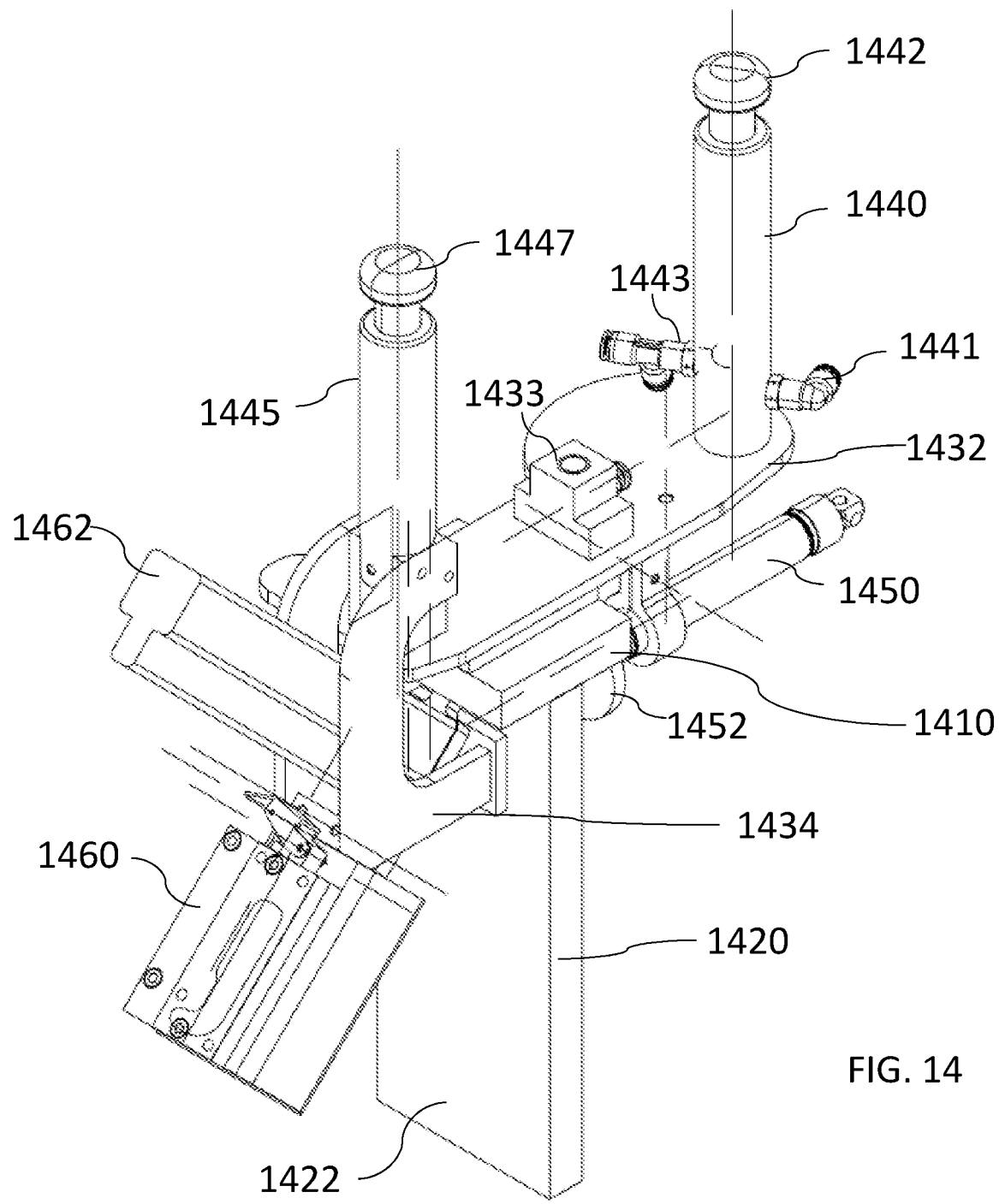
FIG. 14 is a perspective view of another device that can be used to couple a first workpiece to a second workpiece, in accordance with certain embodiments.
Figure 15:
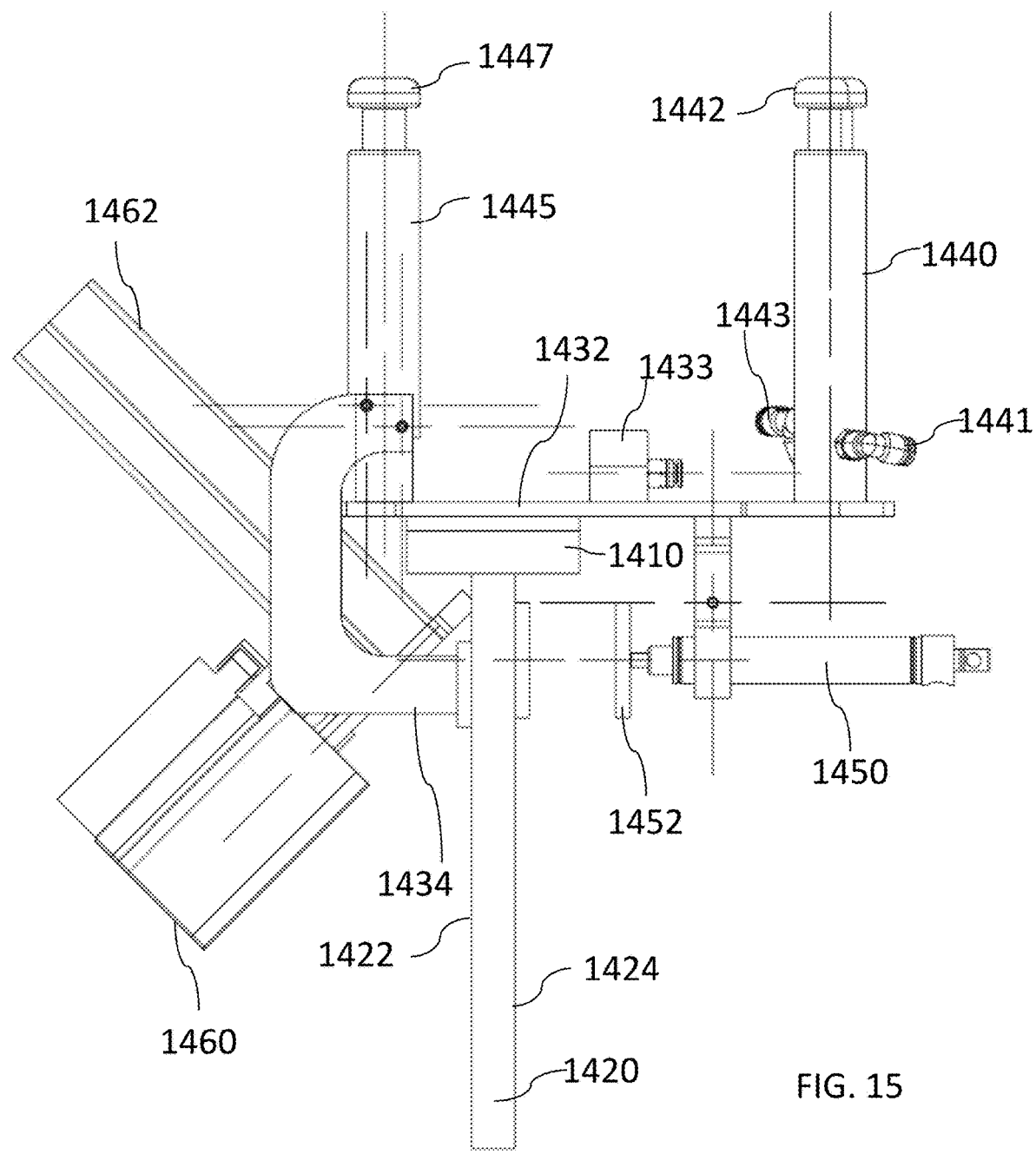
FIG. 15 is a side view of the device of FIG. 14, in accordance with certain examples.

In certain embodiments and referring to FIG. 14 (perspective view) and FIG. 15 (side view), a different configuration of a device 1400 suitable for coupling two or more workpieces to each other is shown. The device 1400 is shown positioned around a cabinet face 1410 and one section of a cabinet frame structure 1420. A planar member 1432 of a base contacts an outer surface of the cabinet face 1410. A protrusion 1433 is present to protect the valve assemblies. The base may also be sized and arranged with one or more protrusions or suitably shaped such that the base, and not the actuation means and/or any ports, contact a floor surface or other surface if the device 1400 is dropped. A second planar member 1434 of the base contacts a first surface 1422 of the cabinet structure 1420. Compared to the angled member 1334 shown in FIG. 13, the member 1434 generally comprises a C-shape rather than a downward angle, though other shapes can also be used for the second member 1434. A head 1452 of the piston means 1450, e.g., a pneumatic cylinder, contacts a second surface 1424 of the cabinet structure 1420. The second surface 1424 is generally on an opposite surface from the surface 1422 of the cabinet structure 1420. A first actuation means 1440, e.g., a handle assembly, comprises a first plunger 1442. In this configuration, no plunger block is shown though one could be present if desired. A second actuation means 1445, e.g., a handle assembly, comprises a second plunger 1447. Again, no plunger block is present on the second actuation means 1445 though one could be present if desired. The device 1400 also comprises an attachment device 1460 coupled to the member 1434 of the base. The attachment device 1460 comprises a replaceable or removable magazine 1462 comprising a plurality of fasteners, e.g., staples, nails, etc. The first actuation means 1440 is fluidically coupled to an air compressor (not shown) through a first port 1441. The first actuation means 1440 is also fluidically coupled to the piston means 1450 through a fluid line (not shown) that can be coupled to one outlet of the port 1443 when the first plunger 1442 is depressed. The first actuation means 1440 is also fluidically coupled to the second actuation means 1445 through a fluid line (not shown) that can be coupled to the other outlet of the port 1443 when the first plunger 1442 is depressed. The second actuation means 1445 is fluidically coupled to the attachment device 1460 when the second plunger 1447 is pressed through a fluid line (not shown). In operation of the device 1400, the plunger 1442 is first depressed and held to pressurize the actuation means 1445 and the piston means 1450. Prior to pressurization of the actuation means 1445, depression of the actuation means 1445 generally does not result in the attachment device 1460 dispensing a fastener. Once pressurized, pressing of the plunger 1447 causes a fastener to dispense from the magazine 1462 of the attachment device 1460 into the surface 1422 of the cabinet structure 1420 and into a lower surface of the cabinet frame 1410. For example, a staple can be inserted into the surface 1422 and into a back surface of the cabinet face frame 1410 without penetrating through an outer surface of the cabinet face frame 1410. The inserted fastener holds the cabinet face frame 1410 to the cabinet structure 1420 until an adhesive between the cabinet structure 1420 and cabinet face frame 1410 can cure. If desired, the adhesive may be omitted, and the cabinet face frame can be fastened at multiple different sites using the devices described herein. Once the plunger 1447 is depressed, in certain configurations it must be released to permit pressure to build back up in the device 1400. In other configurations, each of the plungers 1442, 1447 must be released after dispensing a fastener to permit the pressure to build back up in the compressor fluidically coupled to the device.

The actuation means of the devices described herein may comprise one or more internal control valves to assist with and/or control the pressure provided to the various downstream components of the device. While not wishing to be bound by any particular theory, the amount of internal pressure in the system can control the depth at which the fastener is inserted. For harder materials, it may be desirable to use a higher pressure than for softer materials. While the exact pressure of the system can vary, illustrative pressures used include, but are not limited to, about 60 psi to about 120 psi or about 70 psi 10 about 110 psi or about 80 psi to about 90 psi. For the second actuation means coupled to the attachment device, an internal 3-way valve can be present to provide fluidic coupling between the various components to permit dispensing of the fastener upon depression of the plunger of the second actuation means. The exact dimensions of the valves can vary and 0.25 inch, 0.5 inch, ⅜ inch or even 0.75 inch diameter valves can be used depending on the desired pressures in the device. The valves or valve seals can be replaced as needed to maintain a suitable pressure in the device. In some examples, one or more of the actuation means may comprise an internal spring coupled to the plungers to cause the plungers to reset in an upward position when the user releases the plunger.

In other examples, the piston means, base or other component of the device may comprise a pressure sensor to ensure the various components of the device contact the workpiece surfaces prior to the device being rendered operable to dispense the device. For example and referring again to FIG. 15, a pressure sensor can be present on the planar member 1432 to ensure the base contacts the workpiece 1410. Similarly, if desired, a pressure sensor can be present on the head 1452 of the piston to ensure the head 1452 contacts the workpiece 1422. Once contact is achieved, the pressure sensors could release an internal stop to permit the actuation means 1440 to be pressurized. For example, the pressure sensors can be electrically coupled to a processor and one or more valves to control air flow into the actuation means 1440 through the port 1441. The port 1441 may comprise a valve which can be kept closed until the one or more pressure sensors sense contact of the appropriate surfaces. The valve in the port 1441 can then be opened to permit air to flow into the actuation means 1440.

Figure 16:
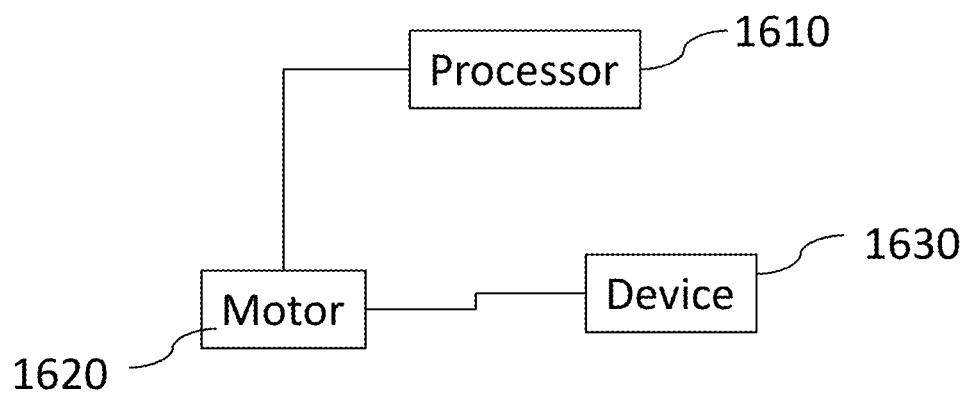
FIGS. 16 and 17 are illustration of an automated system comprising a device that can be used to couple two or more workpieces to each other, in accordance with certain configurations.
Figure 17:
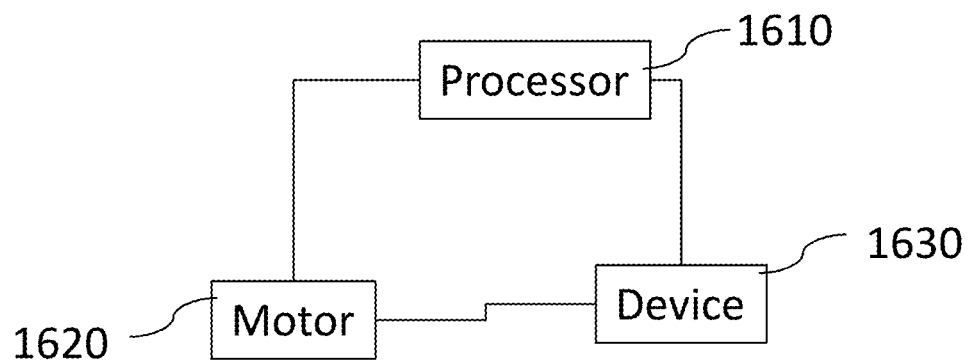

In certain embodiments, the devices described herein can be used in an automated or robotic assembly method to join two or more workpieces to each other. For example, the plunger can be coupled to one or more rods or linkages to permit robotic control of the device by movement of the rods or linkages and depression of the plungers. Such systems can automate assembly of workpieces to each other and may find particularly usefulness in cabinetry assembly, furniture assembly, assembly of a walls, ceilings, etc. in recreational vehicles, storage containers, etc. and other uses. Referring to FIG. 16, the robotic assembly 1600 may comprise a processor 1610 electrically coupled to one or more motors (or engines) 1620 which are coupled to a device 1630 configured to couple two or more workpieces as described herein. As shown in FIG. 17, the processor 1610 can also be electrically coupled to the device 1630 if desired to control pressures, plunger depression, etc. If desired, an automated system where no human interaction is used may only comprise a single actuation means rather than the two actuation means illustrated in certain configurations above. For example, a single actuation means can be configured with suitable internal valving to move the piston means, pressurize the attachment device and then dispense a fastener into the workpieces upon depression of the plunger. Where automated systems are used, the additional safety features of a second actuation means are not needed. Further, automated movement of the device by way of a gantry, table, etc. permits omission of the second actuation means since no human needs to hold the device. In some embodiments, the device can be mounted on a three-dimensional table and workpieces can be moved and/or lowered into position above the device for fastening. The exact position of the device can be adjusted in three dimensions by adjusting the x, y and z positions of the table to fine tune engagement of the device with the workpieces prior to dispensing of a fastener.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A device configured to attach two workpieces to each other, the device comprising:
    a base comprising a planar member configured to engage a planar surface of a first workpiece, the base further comprising a second member coupled to the planar member, the second member configured to engage a first planar surface of a second workpiece positioned adjacent to the first workpiece, the second member further configured to receive an attachment device;
    a first handle coupled to the base, in which the first handle comprises a first internal valve configured to fluidically couple to an external pressure source, in which the first handle further comprises a first plunger configured to actuate the first internal valve to an open position after movement of the first plunger from a first position to a second position and to close the first internal valve after release of the first plunger to the first position, wherein in the open position the first internal valve permits air pressure to build in the device;
    a second handle coupled to the base, in which the second handle comprises a second internal valve configured to fluidically couple to the first internal valve of the first handle upon movement of the first plunger of the first handle to the second position of the first internal valve, in which the second handle further comprises a second plunger configured to actuate the second internal valve to an open position after movement of the second plunger from a first position to a second position and to close the second internal valve after release of the second plunger to the first position, wherein the second internal valve is configured to fluidically couple to the attachment device when the second plunger is moved to the second position to actuate the attachment device and cause the attachment device to insert a first fastener into the first and second workpieces to hold them together, wherein, after insertion of the first fastener into the first and second workpieces, the second plunger is configured to be released to permit movement of the second plunger from the second position to the first position to permit air pressure to build up again in the device, when the first plunger remains in the second position, before a second movement of the second plunger from the first position to the second position causes the attachment device to insert a second fastener into the first and second workpieces; and
    a pneumatic cylinder coupled to the planar member of the base and fluidically coupled to the first internal valve of the first handle upon movement of the first plunger of the first handle from the first position to the second position, the pneumatic cylinder configured to engage a second planar surface of the second workpiece when the first plunger is moved from the first position to the second position.

2. The device of claim 1, further comprising an attachment device removably coupled to the second member of the base.

3. The device of claim 1, wherein the attachment device is configured as a pneumatic stapler, a pneumatic nail gun, a pneumatic brad gun or a pneumatic screw gun.

4. The device of claim 1, wherein the first handle further comprises a first plunger block configured to prevent movement of the first plunger from the first position to the second position in a first state of the first plunger block and to permit movement of the first plunger from the first position to the second position in a second state of the first plunger block.

5. The device of claim 4, wherein the second handle further comprises a second plunger block configured to prevent movement of the second plunger from the first position to the second position in a first state of the second plunger block and to permit movement of the second plunger from the first position to the second position in a second state of the second plunger block.

6. The device of claim 1, wherein the pneumatic cylinder comprises a piston shaft and a head, wherein the piston shaft is configured to move from a first position to a second position upon fluidic coupling of the first handle to the pneumatic cylinder, and wherein in the second position of the piston shaft the head of the pneumatic cylinder engages the second planar surface of the second workpiece.

7. The device of claim 6, wherein the head comprises a non-marring material.

8. The device of claim 1, wherein the first plunger of the first handle is configured as a button plunger shaft assembly.

9. The device of claim 8, wherein the second plunger of the second handle is configured as a button plunger shaft assembly.

10. The device of claim 8, wherein the first handle further comprises a 3-way valve configured to fluidically couple the pneumatic cylinder to the first handle when the first plunger is moved from the first position to the second position and to fluidically couple the second handle to the first handle when the first plunger is moved from the first position to the second position.

11. The device of claim 10, wherein the second plunger of the second handle is configured as a button plunger shaft assembly.

12. The device of claim 11, wherein the second handle further comprises a valve configured to fluidically couple the attachment device to the second handle when the second plunger is moved from the first position to the second position.

13. The device of claim 1, wherein the pneumatic cylinder is coupled to the base through an adjustable mount.

14. The device of claim 1, wherein the pneumatic cylinder is coupled to the base through a fixed mount.

15. The device of claim 1, wherein each of the first handle and the second handle comprises a cylindrical handle core configured to receive a button plunger shaft assembly and a valve.

16. The device of claim 15, further comprising a first fluid line that provides fluidic coupling between the first internal valve of the first handle and the pneumatic cylinder when the first plunger of the first handle is moved from the first position to the second position.

17. The device of claim 16, further comprising a second fluid line that provides fluidic coupling between the first internal valve of the first handle and the second handle when the first plunger of the first handle is moved from the first position to the second position.

18. The device of claim 17, further comprising a third fluid line that provides fluidic coupling between the second internal valve of the second handle and the attachment device when the second plunger of the second handle is moved from the first position to the second position.

19. The device of claim 1, wherein movement of the first plunger to the second position of the first plunger and movement of the second plunger to the second position of the second plunger is configured to dispense a single fastener from the attachment device and decreases air pressure in the device after dispensing of the single fastener from the attachment device.

* * * * *